(12) United States Patent
Park et al.

(10) Patent No.: US 10,932,258 B2
(45) Date of Patent: Feb. 23, 2021

(54) METHOD AND APPARATUS FOR TRANSMITTING AND RECEIVING CONTROL INFORMATION AND DATA INFORMATION IN WIRELESS COMMUNICATION SYSTEM

(71) Applicant: Samsung Electronics Co., Ltd., Suwon-si (KR)

(72) Inventors: Sungjin Park, Suwon-si (KR); Jeongho Yeo, Suwon-si (KR); Jinyoung Oh, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/222,245

(22) Filed: Dec. 17, 2018

(65) Prior Publication Data

US 2019/0191433 A1    Jun. 20, 2019

(30) Foreign Application Priority Data

Dec. 15, 2017  (KR) .................. 10-2017-0173503
Jan. 12, 2018  (KR) .................. 10-2018-0004542

(51) Int. Cl.
| | |
|---|---|
| H04W 72/04 | (2009.01) |
| H04L 5/00 | (2006.01) |
| H04L 27/26 | (2006.01) |
| H04L 1/00 | (2006.01) |

(52) U.S. Cl.
CPC .......... *H04W 72/0446* (2013.01); *H04L 1/00* (2013.01); *H04L 5/0092* (2013.01); *H04L 27/2602* (2013.01); *H04L 27/2607* (2013.01); *H04L 27/2666* (2013.01); *H04L 5/0007* (2013.01)

(58) Field of Classification Search
CPC .... H04L 5/0048; H04L 5/0053; H04L 5/0023
See application file for complete search history.

(56) References Cited

U.S. PATENT DOCUMENTS 10,356,800 B2 *   7/2019   Manolakos ......... H04L 27/2602
2017/0332359 A1   11/2017   Tsai et al.

OTHER PUBLICATIONS

Intel Corporation, 'Extended CP numerology', R1-1700391, 3GPP TSG RAN WG1 NR Ad Hoc Meeting, Spokane, USA, Jan. 10, 2017.
Huawei et al., 'Support of 60 kHz subcarrier spacing', R1-1721411, 3GPP TSG RAN WG1 Meeting #91, Reno, USA, Nov. 28, 2017.
LG Electronics, 'Multiplexing NCP and ECP', R1-1710358, 3GPP TSG RAN WG1 Meeting Ad-Hoc, Qingdao, P.R. China, Jun. 17, 2017.
Huawei et al., 'Remaining issues on ECP', R1-1717910, 3GPP TSG RAN WG1 Meeting 90bis, Prague, Czech Republic, Oct. 2, 2017.

(Continued)

*Primary Examiner* — Chandrahas B Patel
(74) *Attorney, Agent, or Firm* — Jefferson IP Law, LLP

(57) ABSTRACT

An operation method of a terminal in a wireless communication system is provided. The operation method includes receiving a subcarrier spacing configuration and cyclic prefix information from a base station through higher layer signaling; and when the subcarrier spacing configuration indicates subcarrier spacing of 60 kHz and the cyclic prefix information indicates an extended cyclic prefix, determining a slot format with the extended cyclic prefix based on a slot format with a normal cyclic prefix.

12 Claims, 12 Drawing Sheets

(56) References Cited

OTHER PUBLICATIONS

International Search Report dated Mar. 22, 2019, issued in International Patent Application No. PCT/KR2018/0106047.
European Office Action dated Sep. 18, 2020, issued in a counterpart European Application No. 18888540.4—120513677080.
Intel Corporation; Extended CP numerology; 3GPP TSG RAN WG1 NR Ad Hoc Meeting; R1-1700391; Jan. 20, 2017, Spokane, USA.
LG Electronics; Multiplexing NCP and ECP; 3GPP TSG RAN WG1 Meeting Ad-Hoc; R1-1710358; Jun. 30, 2017, Qingdao, P.R. China.
Qualcomm Incorporated; NR numerology scaling and alignment; 3GPP TSG-RAN WG1 #86-BIS; R1-1610131. Oct. 14, 2016, Lisbon, Portugal.
Huawei, HiSilicon; Discussion on evaluation on ECP; 3GPP TSG RAN WG 1 NR Ad Hoc Meeting; RI-1700003; Jan. 20, 2017, Spokane, USA.
3rd Generation Partnership Project; Technical Specification Group Radio Access Network; NR Physical channels and modulation' (Release 15), Dec. 13, 2017.

* cited by examiner

METHOD AND APPARATUS FOR TRANSMITTING AND RECEIVING CONTROL INFORMATION AND DATA INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0173503, filed on Dec. 15, 2017, in the Korean Intellectual Property Office, and of a Korean patent application number 10-2018-0004542, filed on Jan. 12, 2018, in the Korean Intellectual Property Office, the disclosure of each of which is incorporated by reference herein in its entirety.

BACKGROUND

1. Field

The disclosure relates to methods and apparatuses for transmitting and receiving control information and data information in a wireless communication system.

2. Description of Related Art

To meet the increase in demand for wireless data traffic after the commercialization of 4G communication systems, considerable efforts have been made to develop pre-5G communication systems or 5G communication systems. This is one reason why '5G communication systems' or 'pre-5G communication systems' are called 'beyond 4G network communication systems' or 'post long-term evolution (LTE) systems.' In order to achieve a high data transmission rate, 5G communication systems are being developed to be implemented in a super-high frequency band (millimeter wave (mmWave)), e.g., a band of 60 GHz. In order to reduce the occurrence of stray electric waves in such a super-high frequency band and to increase a transmission distance of electric waves in 5G communication systems, various technologies are being studied, for example, beam-forming, massive multiple input multiple output (MIMO), full dimensional MIMO (FD-MIMO), array antennas, analog beam-forming, and large scale antennas. In order to improve system networks for 5G communication systems, various technologies have been developed, e.g., evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), mon-orthogonal multiple access (NOMA), and sparse code multiple access (SCMA), which are advanced access schemes.

The Internet has evolved from a human-based connection network, where humans create and consume information, to the Internet of things (IoT), where distributed configurations, such as objects, exchange information with each other to process the information. Internet of everything (IoE) technology is being newly provided, in which technology related to the IoT is combined with, for example, technology for processing big data through connection with a cloud server. In order to implement the IoT, various technical components are required, such as, a sensing technique, wired/wireless communication and network infrastructures, a service interfacing technique, a security technique, etc. In recent years, techniques including a sensor network for connecting objects, machine to machine (M2M) communication, machine type communication (MTC), etc. have been studied. In the IoT environment, intelligent internet technology (IT) services may be provided to collect and interpret data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are implemented by using 5G communication technology including beam-forming, MIMO, array antenna, etc. The application of the cloud radio access network (RAN) as a big data processing technique described above may be an example of convergence of the 5G communication technology and the IoT technology.

As described above, with the development of wireless communication systems, various services are now providable, and thus, a way of smoothly providing these services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for effectively providing a service in a wireless communication system.

Additional aspects will be set forth in part in the description which follows and, in part, will be apparent from the description, or may be learned by practice of the presented embodiments.

In accordance with an aspect of the disclosure, an operation method of a terminal in a wireless communication system is provided. The operation method includes receiving a subcarrier spacing configuration and cyclic prefix information from a base station through higher layer signaling; and when the subcarrier spacing configuration indicates subcarrier spacing of 60 kHz and the cyclic prefix information indicates an extended cyclic prefix, determining a slot format with the extended cyclic prefix based on a slot format with a normal cyclic prefix.

The slot format with the extended cyclic prefix may be determined based on the slot format with the normal cyclic prefix and subcarrier spacing of 15 kHz, 30 kHz, or 60 kHz.

The determining of the slot format may include determining a symbol of the slot format with the extended cyclic prefix as a downlink symbol, an uplink symbol, or a flexible symbol, if symbols of the slot format with the normal cyclic prefix that overlap the symbol of the slot format with the extended cyclic prefix are downlink symbols, uplink symbols, or flexible symbols.

The determining of the slot format may include determining a symbol of the slot format with the extended cyclic prefix as a flexible symbol, if symbols of the slot format with the normal cyclic prefix that overlap the symbol of the slot format with the extended cyclic prefix include a flexible symbol.

The determining of the slot format may include determining a symbol of the slot format with the extended cyclic prefix as a flexible symbol, if symbols of the slot format with the normal cyclic prefix that overlap the symbol of the slot format with the extended cyclic prefix include a downlink symbol and an uplink symbol.

In accordance with another aspect of the disclosure, an operation method of a terminal in a wireless communication system is provided. The operation method includes receiving a bandwidth part configuration including a first subcarrier spacing configuration different from a reference subcarrier spacing configuration and cyclic prefix information from a base station through higher layer signaling; and when receiving a slot format indicator indicating a slot format with the reference subcarrier spacing configuration, mapping link information of the slot format indicator to each of the $2^n$ consecutive symbols within $2^n$ consecutive slots.

The value of n may indicate a difference between the reference subcarrier spacing configuration value and the first subcarrier spacing configuration value and the value of n may be a natural number.

The mapping the link information of the slot format indicator to each of the $2^n$ consecutive symbols within $2^n$ consecutive slots may include when the link information indicated by the slot format indicator is a downlink symbol, an uplink symbol, or a flexible symbol, determining each of the $2^n$ consecutive symbols as downlink symbols, uplink symbols, or flexible symbols.

Each of the $2^n$ consecutive symbols may be temporally dependent on the symbol index of the slot format indicated by the slot format indicator.

In accordance with another aspect of the disclosure, a terminal operating in a wireless communication system is provided. The terminal includes a transceiver, at least one memory storing a program, and at least one processor, by executing the program, configured to receive a subcarrier spacing configuration and cyclic prefix information from a base station through higher layer signaling, and when the subcarrier spacing configuration indicates subcarrier spacing of 60 kHz and the cyclic prefix information indicates an extended cyclic prefix, determine a slot format with the extended cyclic prefix based on a slot format with a normal cyclic prefix.

The slot format with the extended cyclic prefix may br determined based on the slot format with the normal cyclic prefix and subcarrier spacing of 15 kHz, 30 kHz, or 60 kHz.

The at least one processor may be further configured to determine a symbol of the slot format with the extended cyclic prefix as a downlink symbol, an uplink symbol, or a flexible symbol, if symbols of the slot format with the normal cyclic prefix that overlap the symbol of the slot format with the extended cyclic prefix are downlink symbols, uplink symbols, or flexible symbols.

The at least one processor may be further configured to determine a symbol of the slot format with the extended cyclic prefix as a flexible symbol, if symbols of the slot format with the normal cyclic prefix that overlap the symbol of the slot format with the extended cyclic prefix include a flexible symbol.

The at least one processor may be further configured to determine a symbol of the slot format with the extended cyclic prefix as a flexible symbol, if symbols of the slot format with the normal cyclic prefix that overlap the symbol of the slot format with the extended cyclic prefix include a downlink symbol and an uplink symbol.

In accordance with another aspect of the disclosure, a terminal operating in a wireless communication system is provided. The terminal includes a transceiver, at least one memory storing a program, and at least one processor, by executing the program, configured to receive a bandwidth part configuration including a first subcarrier spacing configuration different from a reference subcarrier spacing configuration and cyclic prefix information from a base station through higher layer signaling, and when receiving a slot format indicator indicating a slot format with the reference subcarrier spacing configuration, mapping link information of the slot format indicator to each of the $2^n$ consecutive symbols within $2^n$ consecutive slots.

The value of n may indicate a difference between the reference subcarrier spacing configuration value and the first subcarrier spacing configuration value and the value of n may be a natural number.

The at least one processor may be further configured to when the link information indicated by the slot format indicator is a downlink symbol, an uplink symbol, or a flexible symbol, determine each of the $2^n$ consecutive symbols as downlink symbols, uplink symbols, or flexible symbols.

Each of the $2^n$ consecutive symbols may be temporally dependent on the symbol index of the slot format indicated by the slot format indicator.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
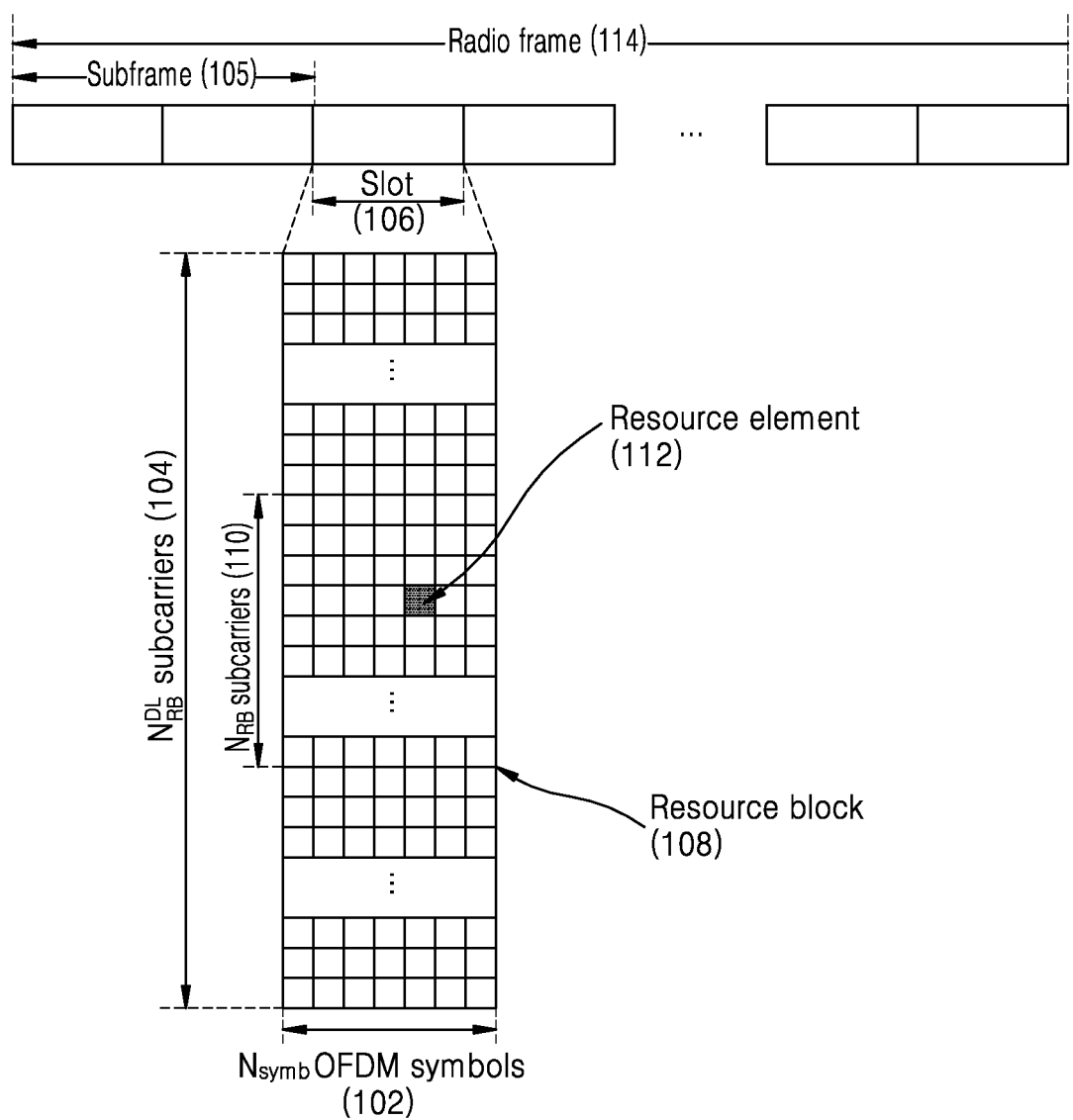
FIG. 1 is a diagram of a transmission structure of a time-frequency domain of a downlink wireless resource region of a long-term evolution (LTE) system, an LTE-Advanced (LTE-A) system, or a similar system according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list.

Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

The disclosure provides configuration information about an uplink (UL), downlink (DL), and flexible link intervals constituting a specific transmission interval taking into account a cyclic prefix (CP). Also, the disclosure provides a time resource allocation method taking into account a CP.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, or a multimedia system capable of performing communication functions. In the disclosure, a DL is a wireless transmission path of a signal transmitted from a base station to a terminal, and a UL is a wireless transmission path of a signal transmitted from a terminal to a base station. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

Hereinafter, in the disclosure, a higher signaling is a method of transmitting a signal from a BS to a terminal by using a DL data channel of a physical layer or from a terminal to a BS by using a UL data channel of a physical layer, and may also be referred to as radio resource control (RRC) signaling or medium access control (MAC) control element (CE).

FIG. 1 is a diagram of a transmission structure of a time-frequency domain of a DL wireless resource region of an LTE system or a similar system according to an embodiment of the disclosure.

Referring to FIG. 1, the horizontal axis represents a time domain and the vertical axis represents a frequency domain in a wireless resource region. In the time domain, a minimum transmission unit is an OFDM symbol, and $N_{symb}$ OFDM symbols 102 are gathered to constitute one slot 106, and two slots are gathered to constitute one sub-frame 105. The length of the slot may be 0.5 ms, and the length of the sub-frame may be 1.0 ms. A radio frame 114 is a time domain interval composed of 10 sub-frames. The minimum transmission unit in the frequency domain is a subcarrier, and the transmission bandwidth of the whole system is composed of $N_{RB}^{DL}$ subcarriers 104 in total. However, such specific numerical values may vary according to a system.

In the time-frequency domain, a basic unit of a resource is a resource element (RE) 112 and may be indicated as an OFDM symbol index and a subcarrier index. A resource block (RB) 108 (or a physical resource block (PRB)) is defined as $N_{symb}$ consecutive OFDM symbols 102 in the time domain and $N_{RB}$ consecutive subcarriers 110 in the frequency domain. Accordingly, one RB 108 is composed of $N_{symb} \times N_{RB}$ REs 112 in one slot.

In general, the minimum transmission unit of data is RB, and in the LTE system, it is general that $N_{symb}$ is 7 and $N_{RB}$ is 12, and $N_{BW}$ and $N_{RB}$ may be proportional to the system transmission bandwidth. However, a system other than the LTE system may use a different value. A data rate is increased in proportion to the number of RBs being scheduled to a terminal.

In the LTE system, 6 transmission bandwidths may be defined and operated. In the case of a frequency division duplexing (FDD) system that divides and operates a DL and a UL through a frequency, the transmission bandwidth of the DL and the transmission bandwidth of the UL may differ from each other. A channel bandwidth indicates a radio frequency (RF) bandwidth that corresponds to the system transmission bandwidth. Table 1 presents a corresponding relationship between the system transmission bandwidth defined in the LTE system and the channel bandwidth. For example, in the LTE system having a channel bandwidth of 10 MHz, the transmission bandwidth may be composed of 50 RBs.

TABLE 1

| | Channel bandwidth BWChannel [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

DL control information may be transmitted within first N OFDM symbols in a sub-frame, where N={1, 2, 3} in general. Accordingly, in accordance with the amount of control information to be transmitted in a current sub-frame, the value N may be varied for each sub-frame. The control information may include a control channel transmission interval indicator indicating how many OFDM symbols the control information is transmitted through, scheduling information on DL data or UL data, and a hybrid automatic repeat request (HARQ) acknowledge (ACK)/negative acknowledge (NACK) signal.

In the LTE system, the scheduling information on the DL data or the UL data is transferred from a BS to a terminal through downlink control information (DCI). The DCI is defined in various formats and may indicate, according to each format, whether the scheduling information is UL data scheduling information (UL grant) or DL data scheduling information (DL grant), whether the DCI is compact DCI having a small size of control information, whether spatial multiplexing using multiple antennas is applied, or whether the DCI is DCI for controlling power. For example, DCI format 1 that is the scheduling control information (DL grant) of the DL data may include at least the following control information:

Resource allocation type 0/1 flag: indicates whether a resource allocation type is type 0 or type 1. The type 0 allocates resources in units of resource block groups (RBGs) through applying of a bitmap type. In the LTE system, a basic unit of scheduling is RB that is expressed as a time and frequency domain resource, and the RBG is composed of a plurality of RBs to be considered as the basic unit of scheduling in the type 0. The type 1 allocates a specific RB in the RBG.

RB assignment: indicates RB that is allocated for data transmission. An expressed resource is determined in accordance with a system bandwidth and a resource allocation method.

Modulation and coding scheme (MCS): indicates a modulation method used for data transmission and the size of a transport block (TB) that is data to be transmitted.

HARQ process number: indicates a process number of HARQ.

New data indicator: indicates whether HARQ transmission is initial transmission or retransmission.

Redundancy version: indicates a redundancy version of HARQ.

Transmit power control (TPC) command for physical uplink control channel (PUCCH): indicates a transmission power control command for a PUCCH that is a UL control channel.

The DCI may be transmitted through a physical downlink control channel (PDCCH) (which also may be referred to as control information) that is a DL physical control channel or an enhanced PDCCH (EPDCCH) (which may also be referred to as enhanced control information) after passing through a channel coding and modulation process.

In general, the DCI is scrambled by a specific radio network temporary identifier (RNTI) or terminal identifier independently with respect to each terminal, is added a cyclic redundancy check (CRC), is channel-coded, and then is configured as an independent PDCCH to be transmitted. In the time domain, the PDCCH is mapped and transmitted for the control channel transmission interval. A mapping location of the PDCCH in the frequency domain is determined by the identifier (ID) of each terminal, and the PDCCH may be transmitted through the transmission band of the whole system.

The DL data may be transmitted through a physical downlink shared channel (PDSCH) that is a physical channel for transmitting the DL data. The PDSCH may be transmitted after the control channel transmission interval, and scheduling information, such as a concrete mapping location or a modulation method in the frequency domain, may be included in the DCI to be transmitted through the PDCCH.

The BS notifies the terminal of a modulation method applied to the PDSCH to be transmitted and a transport block size (TBS) to be transmitted, by using an MCS among the control information constituting the DCI. The MCS may be composed of 5 bits, or may be composed of another number of bits. The TBS corresponds to the size before channel coding for error correction is applied to the TB to be transmitted by the BS.

According to an embodiment a TB may include a MAC header, a MAC CE, at least one MAC service data unit (SDU), and padding bits. Also, a TB may indicate a unit of data or MAC protocol data unit (PDU) transmitted from a MAC layer to a physical layer.

The modulation method supported in the LTE system is quadrature phase shift keying (QPSK), 16 quadrature amplitude modulation (16QAM), or 64QAM, and respective modulation orders (Qm) correspond to 2, 4, and 6. In the case of QPSK modulation, 2 bits per symbol may be transmitted, in the case of 16QAM, 4 bits per symbol may be transmitted, and in the case of 64QAM, 6 bits per symbol may be transmitted. Also, a modulation method of 256QAM or more may be used according to system modification.

Figure 2:
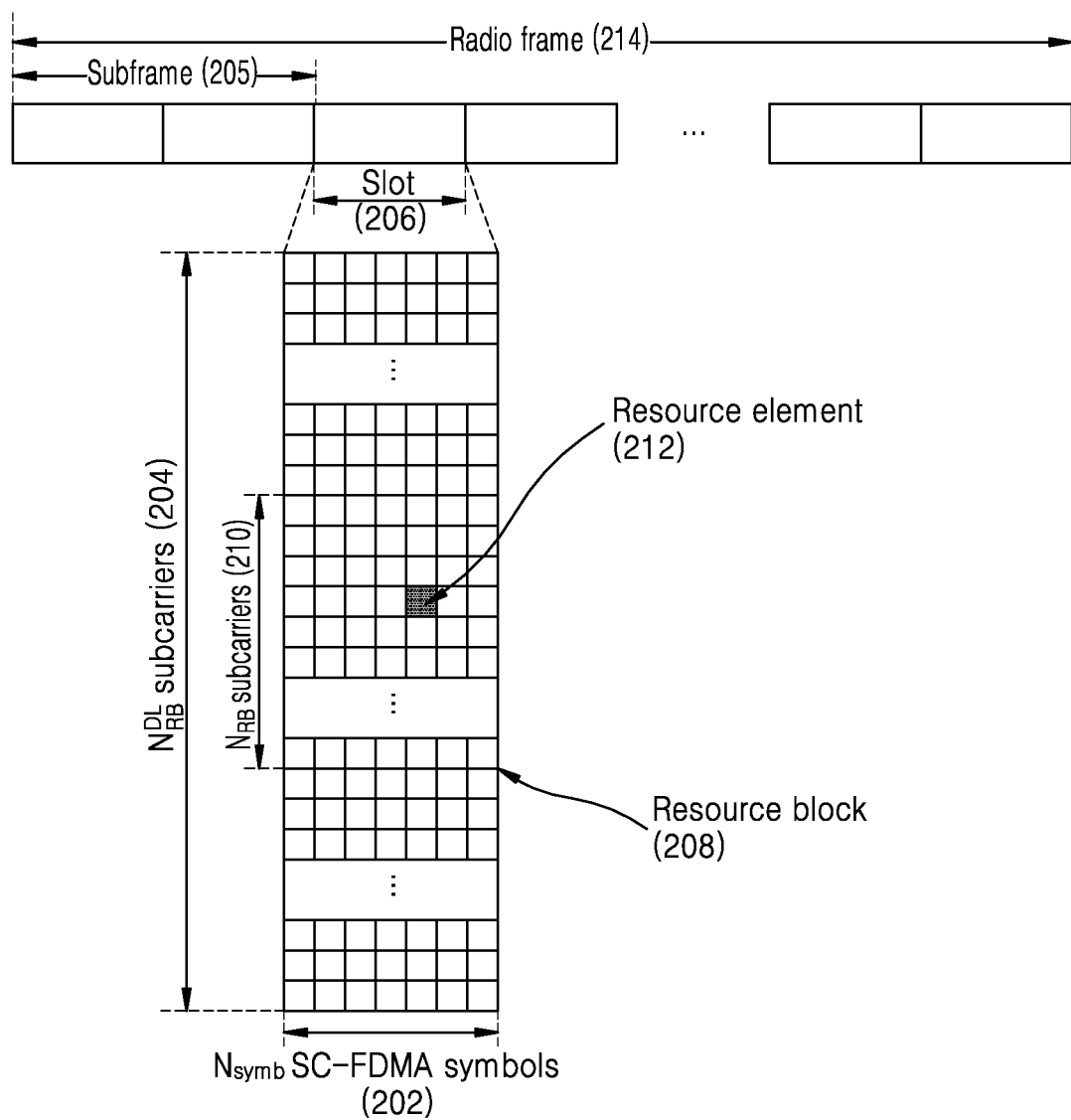
FIG. 2 is a diagram of a transmission structure of a time-frequency domain of an uplink (UL) wireless resource region of an LTE system, an LTE-A system, or a similar system according to an embodiment of the disclosure.

FIG. 2 is a diagram of a transmission structure of a time-frequency domain of a UL wireless resource region of an LTE system, an LTE-A system, or a similar system according to an embodiment of the disclosure.

Referring to FIG. 2, the horizontal axis represents a time domain and the vertical axis represents a frequency domain in a wireless resource region. In the time domain, the minimum transmission unit in a time domain is an SC-FDMA symbol 202, and $N_{symb}^{UL}$ SC-FDMA symbols are gathered to constitute one slot 206. Two slots are gathered to constitute one sub-frame 205. The minimum transmission unit in the frequency domain is a subcarrier, and a transmission bandwidth of the whole system is composed of $N_{RB}^{UL}$ subcarriers 204 in total. $N_{RB}^{UL}$ may have a value in proportion to a system transmission bandwidth.

In the time-frequency domain, a basic unit of a resource is an RE 212 and may be defined as an SC-FDMA symbol index and a subcarrier index. An RB pair 208 is defined as $N_{symb}^{UL}$ consecutive SC-FDMA symbols in the time domain and $N_{RB}$ consecutive subcarriers 210 in the frequency domain. Accordingly, one RB is composed of $N_{symb} \times N_{RB}$ REs. In general, the minimum transmission unit of data or control information is an RB unit. A PUCCH may be mapped on the frequency domain corresponding to 1 RB and transmitted for one sub-frame.

In the LTE system, the timing relationship between a PDCCH that is a physical channel for transmitting DL data or a PDCCH/EPDCCH including a semi-persistent scheduling (SPS) release and a UL physical channel (PUCCH or a physical uplink shared channel (PUSCH)) through which a corresponding HARQ ACK/NACK is transmitted may be defined. As an example, in the LTE system that operates as an FDD, the HARQ ACK/NACK corresponding to the PDSCH transmitted in the (n−4)-th sub-frame or the PDCCH/EPDCCH including the SPS release is transmitted by the PUCCH or PUSCH in the n-th sub-frame.

In the LTE system, a DL HARQ adapts an asynchronous HARQ method in which data re-transmission time is not fixed. When the HARQ NACK is fed back from the terminal with respect to the initially transmitted data transmitted by the BS, the BS freely determines the transmission time of re-transmitted data through the scheduling operation. The terminal buffers the data that is determined as an error as the result of decoding the received data for the HARQ operation, and then performs combining with the next re-transmitted data.

When PDSCH including DL data transmitted from the BS in a sub-frame n is received, the terminal transmits UL control information including HARQ ACK or NACK of the DL data to the BS through PUCCH or PUSCH in a sub-frame n+k. k may be differently defined in accordance with FDD or time division duplex (TDD) of the LTE system and a sub-frame configuration. As an example, in an FDD LTE system, k is fixed to 4. On the other hand, in a TDD LTE system, k may be changed in accordance with the sub-frame configuration and a sub-frame number. During data transmission through a plurality of carriers, the value of k may be differently applied in accordance with a TDD configuration of each carrier.

In the LTE system, in contrast to DL HARQ, UL HARQ adapts a synchronous HARQ method in which data transmission time is fixed. A UL/DL timing relationship among a physical uplink shared channel (PUSCH) that is a physical channel for transmitting the UL data, a PDCCH that is a preceding DL control channel, and a physical hybrid indicator channel (PHICH) that is a physical channel through which the DL HARQ ACK/NACK corresponding to the PUSCH is transmitted may be fixed by the following rule.

When the PDCCH including UL scheduling control information transmitted from the BS in the sub-frame n or the PHICH through which the DL HARQ ACK/NACK is transmitted is received, the terminal transmits the UL data corresponding to the control information through the PUSCH in the sub-frame n+k. k may be differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number. During data transmission through a plurality of carriers, the value of k may be differently applied in accordance with a TDD configuration of each carrier.

Also, when the terminal receives the PHICH that carries the DL HARQ ACK/NACK from the BS in a sub-frame i, the PHICH corresponds to the PUSCH transmitted by the terminal in a sub-frame i−k. In this example, k is differently defined in accordance with the FDD or TDD of the LTE system and its configuration. As an example, in the FDD LTE system, k is fixed to 4. On the other hand, in the TDD LTE system, k may be changed in accordance with the sub-frame configuration and the sub-frame number. During data transmission through a plurality of carriers, the k value may be differently applied in accordance with the TDD configuration of each carrier based on the cell-RNTI (C-RNTI).

TABLE 2

| | PDCCH and PDSCH configured by C-RNTI | | |
|---|---|---|---|
| Transmission Mode | DCI Format | Search Space | Transmission scheme of PDSCH corresponding to PDCCH |
| Mode 1 | DCI Format 1A | Common and terminal specific by C-RNTI | Single-antenna port, port 0 |
| | DCI Format 1 | Terminal specific by C-RNTI | Single-antenna port, port 0 |
| Mode 2 | DCI Format 1A | Common and terminal specific by C-RNTI | Transmit diversity |
| | DCI Format 1 | Terminal specific by C-RNTI | Transmit diversity |
| Mode 3 | DCI Format 1A | Common and terminal specific by C-RNTI | Transmit diversity |
| | DCI Format 2A | Terminal specific by C-RNTI | Large delay CDD or transmit diversity |
| Mode 4 | DCI Format 1A | Common and terminal specific by C-RNTI | Transmit diversity |
| | DCI Format 2 | Terminal specific by C-RNTI | Closed-loop spatial multiplexing or transmit diversity |
| Mode 5 | DCI Format 1A | Common and terminal specific by C-RNTI | Transmit diversity |
| | DCI Format 1D | Terminal specific by C-RNTI | Multi-user MIMO |
| Mode 6 | DCI Format 1A | Common and terminal specific by C-RNTI | Transmit diversity |
| | DCI Format 1B | Terminal specific by C-RNTI | Closed-loop spatial multiplexing using a single transmission layer |
| Mode 7 | DCI Format 1A | Common and terminal specific by C-RNTI | When the number of PBCH antenna ports is one, single-antenna port, port 0 is used; otherwise transmit diversity |
| | DCI Format 1 | Terminal specific by C-RNTI | Single-antenna port, port 5 |

TABLE 2-continued

PDCCH and PDSCH configured by C-RNTI

| Transmission Mode | DCI Format | Search Space | Transmission scheme of PDSCH corresponding to PDCCH |
|---|---|---|---|
| Mode 8 | DCI Format 1A | Common and terminal specific by C-RNTI | When the number of PBCH antenna ports is one, single-antenna port, port 0 is used; otherwise transmit diversity |
| | DCI Format 2B | Terminal specific by C-RNTI | Dual layer transmission, port 7 and 8 or single-antenna port, port 7 or 8 |

Table 2 shows supportable DCI formats according to each transmission mode under a condition set by C-RNTI in 3GPP TS 36.213. A terminal performs searching and decoding assuming that a DCI format exists in a control region interval according to a pre-set transmission mode. For example, when the terminal is instructed with Transmission Mode 5, the terminal searches a common search space and a terminal-specific search space for DCI format 1A, and searches only a terminal-specific search space for DCI format 2B.

A wireless communication system has been described above with reference to an LTE system, but an embodiment is not applied only to the LTE system, but may also be applied to various wireless communication systems, such as NR and 5G systems. When an embodiment is applied to another wireless communication system, the value of k may be changed even in a system using a modulation method corresponding to FDD.

Figure 3:
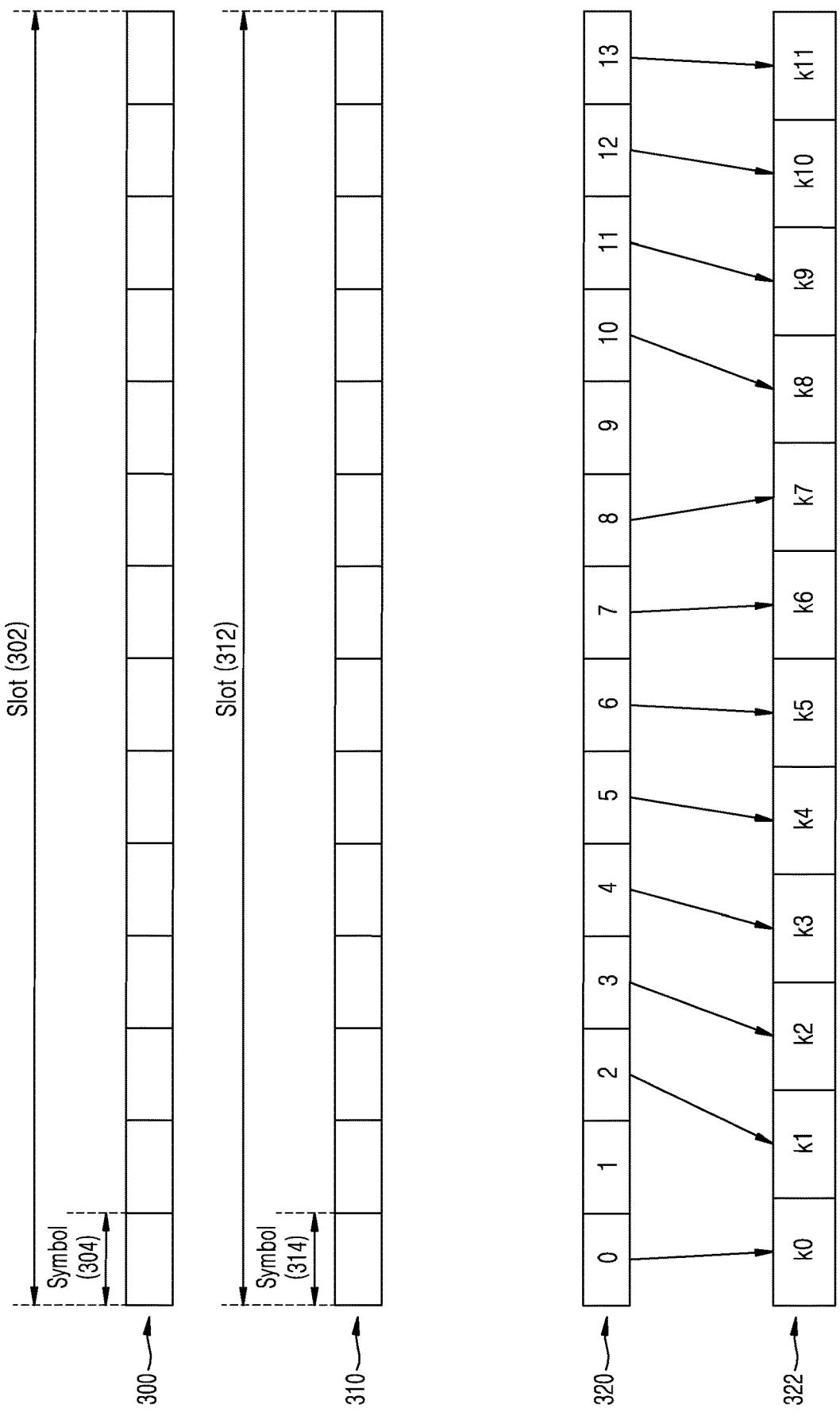
FIG. 3 is a block diagram illustrating a transmission unit structure of a cyclic prefix (CP) according to an embodiment of the disclosure.

FIG. 3 is a block diagram illustrating a transmission unit structure of a CP according to an embodiment of the disclosure.

Referring to FIG. 3, the CP is divided into a normal cyclic prefix (NCP) and an extended cyclic prefix (ECP). The purpose of the CP is to prevent inter symbol interference (ISI) while each symbol of a specific subcarrier reference is transmitted on a multipath channel. To this end, a guard interval that is longer than the maximum delay spread of the channel is inserted between consecutive symbols. A method of copying a signal of a last interval of a valid symbol interval and inserting the signal in front is called a CP. For reference, 5G or NR systems provide a variety of subcarrier spacing unlike LTE. The LTE system provides 15 kHz at subcarrier spacing, but provides a subcarrier spacing of 15 kHz, 30 kHz, 60 kHz, 120 kHz, or 240 kHz for the 5G or NR system. In the 5G or NR system, the subcarrier spacing of 15 kHz, 30 kHz, 120 kHz, and 240 kHz usually provides only the NCP, whereas the subcarrier spacing of 60 kHz usually provides both the NCP and the ECP. Providing the ECP even at the subcarrier spacing of 15 kHz, 30 kHz, 120 kHz, and 240 kHz may be included in the 5G or NR system.

Table 3 shows a time unit constituting one slot according to a subcarrier spacing. The slot is a basic unit in which a BS and a terminal exchange data. The subframe means a radio transmission unit having a length of 1 ms like an LTE system. In the 5G or NR system, when the subcarrier spacing is 15 kHz, the length of one slot is 1 ms, which is equal to the subframe length, and the start point coincides with the end point. When the subcarrier spacing is 30 kHz, the length of one slot is 0.5 ms and two slots constitute one subframe. When the subcarrier spacing is 60 kHz, the length of one slot is 0.25 ms and four slots constitute one subframe. When the subcarrier spacing is 120 kHz, the length of one slot is 0.125 ms and eight slots constitute one subframe. When the subcarrier spacing is 240 kHz, the length of one slot is 0.0625 ms and sixteen slots constitute one subframe. In Table 3, us means microseconds and ms means millimeter seconds.

TABLE 3

Time unit of one slot according to subcarrier spacing

| Subcarrier spacing | Time unit per slot |
|---|---|
| 15 kHz | 1000 us (= 1 ms) |
| 30 kHz | 500 us |
| 60 kHz | 250 us |
| 120 kHz | 125 us |
| 240 kHz | 62.5 us |

Referring to FIG. 3, the number of OFDM symbols constituting one slot is differently illustrated according to the CP type, regardless of the subcarrier spacing. In general, one slot 302 in a CP-based slot structure 300 is composed of 14 OFDM symbols 304. One slot 312 in an ECP-based slot structure 310 is composed of twelve OFDM symbols 314.

Slot format indicator (SFI) notifies whether OFDM symbols constituting one slot are DL, UL, or flexible link, or whether OFDM symbols are a link reserved for future services. The meaning of the flexible link means that it is not DL and UL, and it means that it is an OFDM symbol interval that may be configured by terminal-specific control information in the future. The meaning of the flexible link includes a gap guard required in the process of switching from DL to UL.

The SFI may be transmitted to multiple terminals simultaneously through a terminal group (or cell) common control channel every N slot units. The value of N may be all natural values, or may be 1, 2, 5, 10, 20, or the like.

Table 4 shows the slot format structures that may be applied in the NCP-based slot structure.

TABLE 4

NCP-based slot format structure

| | Symbol number (or index) within one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |

TABLE 4-continued

NCP-based slot format structure

| Format | \multicolumn{14}{c}{Symbol number (or index) within one slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | X | U | D | D | D | D | D | X | U | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | D | X | X | X | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | X | U |
| 61 | D | D | X | X | X | X | U | D | D | X | X | X | X | U |
| 62-255 | \multicolumn{14}{c}{Reserved} |

In Table 4, D represents a DL, U represents a UL, and X represents a flexible link. The total number of slot formats that may be supported in Table 4 is 256, which may be included in terminal group common DL control information with 8 bits. However, some of the supportable 256 slot formats may not be used for future services. Table 4 shows a situation in which only 62 slot formats are actually applied. The slot format information per one carrier may be composed of a total of 8 bits. In a carrier aggregation, when a total of k carrier sets are applicable to specific terminal groups, the size of the SFI information may be 8×k bits. For example, when the number of carrier sets is two, the SFI information may be composed of 16 bits. The first eight bits may be used to inform the slot format structure information for the first carrier, and the subsequent eight bits may be used to inform the slot format structure information for the second carrier.

Alternatively, it may be possible to inform the slot format structure information in another carrier on any carrier. In this situation, when a field indicating a specific carrier is composed of n bits, the size of the SFI information may be composed of 8+n bits. For example, when the number of carrier sets is two, the SFI information may be composed of nine bits. The first bit may be used to inform a specific carrier, and the subsequent eight bits may be used to inform the slot format structure information for the previously indicated carrier.

The slot format in the ECP-based slot structure may be able to provide the following three methods.
1. A method of reusing NCP-based slot format structure
2. A method of changing and using NCP-based slot format structure
3. A method of providing ECP-based slot format structure The first method (the method of reusing the NCP-based slot format structure) means a method applied to an ECP-based slot format structure based on Table 4. Table 4 shows the slot format structure designed in a situation in which one slot is composed of 14 symbols. In order to configure one slot with 12 symbols, it may be possible to implicitly ignore two of the 14 symbol numbers. For example, Table 5 below may be applied as an ECP-based slot format structure.

TABLE 5

ECP-based slot format structure (Example 1)

| Format | \multicolumn{14}{c}{Symbol number (or index) within one slot} |
|---|---|---|---|---|---|---|---|---|---|---|---|---|---|---|
| | 0 | 1 | 2 | 3 | 4 | 5 | 6 | 7 | 8 | 9 | 10 | 11 | | |
| 0 | D | D | D | D | D | D | D | D | D | D | D | D | n/a | n/a |
| 1 | U | U | U | U | U | U | U | U | U | U | U | U | n/a | n/a |
| 2 | X | X | X | X | X | X | X | X | X | X | X | X | n/a | n/a |
| 3 | D | D | D | D | D | D | D | D | D | D | D | D | n/a | n/a |
| 4 | D | D | D | D | D | D | D | D | D | D | D | D | n/a | n/a |
| 5 | D | D | D | D | D | D | D | D | D | D | D | X | n/a | n/a |
| 6 | D | D | D | D | D | D | D | D | D | D | X | X | n/a | n/a |
| 7 | D | D | D | D | D | D | D | D | D | X | X | X | n/a | n/a |
| 8 | X | X | X | X | X | X | X | X | X | X | X | X | n/a | n/a |
| 9 | X | X | X | X | X | X | X | X | X | X | X | X | n/a | n/a |
| 10 | X | U | U | U | U | U | U | U | U | U | U | U | n/a | n/a |
| 11 | X | X | U | U | U | U | U | U | U | U | U | U | n/a | n/a |
| 12 | X | X | X | U | U | U | U | U | U | U | U | U | n/a | n/a |
| 13 | X | X | X | X | U | U | U | U | U | U | U | U | n/a | n/a |
| 14 | X | X | X | X | X | U | U | U | U | U | U | U | n/a | n/a |
| 15 | X | X | X | X | X | X | U | U | U | U | U | U | n/a | n/a |
| 16 | D | X | X | X | X | X | X | X | X | X | X | X | n/a | n/a |
| 17 | D | D | X | X | X | X | X | X | X | X | X | X | n/a | n/a |
| 18 | D | D | D | X | X | X | X | X | X | X | X | X | n/a | n/a |
| 19 | D | X | X | X | X | X | X | X | X | X | X | X | n/a | n/a |
| 20 | D | D | X | X | X | X | X | X | X | X | X | X | n/a | n/a |
| 21 | D | D | D | X | X | X | X | X | X | X | X | X | n/a | n/a |
| 22 | D | X | X | X | X | X | X | X | X | X | X | X | n/a | n/a |
| 23 | D | D | X | X | X | X | X | X | X | X | X | X | n/a | n/a |
| 24 | D | D | D | X | X | X | X | X | X | X | X | X | n/a | n/a |
| 25 | D | X | X | X | X | X | X | X | X | X | X | U | n/a | n/a |
| 26 | D | D | X | X | X | X | X | X | X | X | X | U | n/a | n/a |
| 27 | D | D | D | X | X | X | X | X | X | X | X | U | n/a | n/a |
| 28 | D | D | D | D | D | D | D | D | D | D | D | D | n/a | n/a |
| 29 | D | D | D | D | D | D | D | D | D | D | D | X | n/a | n/a |
| 30 | D | D | D | D | D | D | D | D | D | D | X | X | n/a | n/a |
| 31 | D | D | D | D | D | D | D | D | D | X | X | X | n/a | n/a |
| 32 | D | D | D | D | D | D | D | D | D | D | X | X | n/a | n/a |
| 33 | D | D | D | D | D | D | D | D | D | X | X | X | n/a | n/a |
| 34 | D | X | U | U | U | U | U | U | U | U | U | U | n/a | n/a |
| 35 | D | D | X | U | U | U | U | U | U | U | U | U | n/a | n/a |
| 36 | D | D | D | X | U | U | U | U | U | U | U | U | n/a | n/a |
| 37 | D | X | X | U | U | U | U | U | U | U | U | U | n/a | n/a |
| 38 | D | D | X | X | U | U | U | U | U | U | U | U | n/a | n/a |
| 39 | D | D | D | X | X | U | U | U | U | U | U | U | n/a | n/a |
| 40 | D | X | X | U | U | U | U | U | U | U | U | U | n/a | n/a |
| 41 | D | D | X | X | U | U | U | U | U | U | U | U | n/a | n/a |
| 42 | D | D | D | X | X | X | U | U | U | U | U | U | n/a | n/a |
| 43 | D | D | D | D | D | D | D | D | X | X | X | X | n/a | n/a |
| 44 | D | D | D | D | D | X | X | X | X | X | X | X | n/a | n/a |
| 45 | D | D | D | D | D | D | X | X | U | U | U | U | n/a | n/a |
| 46 | D | D | D | D | D | X | D | D | D | D | D | D | n/a | n/a |
| 47 | D | D | D | D | X | X | D | D | D | D | D | D | n/a | n/a |
| 48 | D | D | X | X | X | X | D | D | X | X | X | X | n/a | n/a |
| 49 | D | X | X | X | X | X | D | X | X | X | X | X | n/a | n/a |
| 50 | X | U | U | U | U | U | U | X | U | U | U | U | n/a | n/a |
| 51 | X | X | U | U | U | U | U | X | X | U | U | U | n/a | n/a |
| 52 | X | X | X | U | U | U | U | X | X | X | U | U | n/a | n/a |
| 53 | X | X | X | X | U | U | U | X | X | X | X | U | n/a | n/a |
| 54 | D | D | D | D | D | X | U | D | D | D | D | D | n/a | n/a |
| 55 | D | D | X | U | U | U | U | D | D | X | U | U | n/a | n/a |
| 56 | D | X | U | U | U | U | U | D | X | U | U | U | n/a | n/a |
| 57 | D | D | D | D | X | X | U | D | D | D | D | X | n/a | n/a |
| 58 | D | D | X | X | U | U | U | D | D | X | X | U | n/a | n/a |
| 59 | D | X | X | U | U | U | U | D | X | X | U | U | n/a | n/a |

TABLE 5-continued

ECP-based slot format structure (Example 1)

| Format | Symbol number (or index) within one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | | |
| 60 | D | X | X | X | X | X | U | D | X | X | X | X | n/a | n/a |
| 61 | D | D | X | X | X | X | U | D | D | X | X | X | n/a | n/a |
| 62-255 | Reserved | | | | | | | | | | | | | |

Table 5 may show the values corresponding to the symbol numbers 12 and 13 in the erased form in the NCP-based slot format structure. Compared to Table 4, even when the terminal receives the same slot format number by the SFI, it may be possible to determine the slot format structure information differently according to the CP information previously configured in the higher layer signaling. For example, when the slot format information 58 is received by the SFI, the slot format in the NCP structure is the same as shown in Table 6 below.

TABLE 6

Values of slot format information 58 applied in NCP-based slot format

| For-mat | Symbol number (or index) within one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 58 | D | D | X | X | U | U | U | D | D | X | X | U | U | U |

The slot format in the ECP structure is shown in Table 7 below.

TABLE 7

Value of slot format information 58 applied in ECP-based slot format

| Format | Symbol number (or index) within one slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 58 | D | D | X | X | U | U | U | D | D | X | X | U |

Table 5 shows an example in which the symbol configuration information corresponding to the 13th symbol and the 14th symbol in one slot is erased in the slot format structure of Table 4. However, the symbol configuration information corresponding to the first symbol and the second symbol in one slot may be erased in the slot format configuration information of Table 4, as shown in Table 8. The symbol configuration information corresponding to the fourth symbol and the eleventh symbol in one slot may also be erased as shown in Table 8-1.

TABLE 8

ECP-based slot format structure (Example 2)

| Format | Symbol number (or index) within one slot | | | | | | | | | | | | |
|---|---|---|---|---|---|---|---|---|---|---|---|---|---|
| | | | 0 | 1 | 2 | 3 | 4 | 5 | 6 | 7 | 8 | 9 | 10 | 11 |
| 0 | n/a | n/a | D | D | D | D | D | D | D | D | D | D | D | D |
| 1 | n/a | n/a | U | U | U | U | U | U | U | U | U | U | U | U |
| 2 | n/a | n/a | X | X | X | X | X | X | X | X | X | X | X | X |
| 3 | n/a | n/a | D | D | D | D | D | D | D | D | D | D | D | X |
| 4 | n/a | n/a | D | D | D | D | D | D | D | D | D | X | X |
| 5 | n/a | n/a | D | D | D | D | D | D | D | D | X | X | X |
| 6 | n/a | n/a | D | D | D | D | D | D | D | X | X | X | X |
| 7 | n/a | n/a | D | D | D | D | D | D | X | X | X | X | X |
| 8 | n/a | n/a | X | X | X | X | X | X | X | X | X | X | U |
| 9 | n/a | n/a | X | X | X | X | X | X | X | X | X | U | U |
| 10 | n/a | n/a | U | U | U | U | U | U | U | U | U | U | U |
| 11 | n/a | n/a | U | U | U | U | U | U | U | U | U | U | U |
| 12 | n/a | n/a | X | U | U | U | U | U | U | U | U | U | U |
| 13 | n/a | n/a | X | X | U | U | U | U | U | U | U | U | U |
| 14 | n/a | n/a | X | X | X | U | U | U | U | U | U | U | U |
| 15 | n/a | n/a | X | X | X | X | U | U | U | U | U | U | U |
| 16 | n/a | n/a | X | X | X | X | X | X | X | X | X | X | X |
| 17 | n/a | n/a | X | X | X | X | X | X | X | X | X | X | X |
| 18 | n/a | n/a | D | X | X | X | X | X | X | X | X | X | X |
| 19 | n/a | n/a | X | X | X | X | X | X | X | X | X | X | U |
| 20 | n/a | n/a | X | X | X | X | X | X | X | X | X | X | U |
| 21 | n/a | n/a | D | X | X | X | X | X | X | X | X | X | U |
| 22 | n/a | n/a | X | X | X | X | X | X | X | X | X | U | U |
| 23 | n/a | n/a | X | X | X | X | X | X | X | X | X | U | U |
| 24 | n/a | n/a | D | X | X | X | X | X | X | X | X | U | U |
| 25 | n/a | n/a | X | X | X | X | X | X | X | X | U | U | U |
| 26 | n/a | n/a | X | X | X | X | X | X | X | X | U | U | U |
| 27 | n/a | n/a | D | X | X | X | X | X | X | X | U | U | U |
| 28 | n/a | n/a | D | D | D | D | D | D | D | D | D | X | U |
| 29 | n/a | n/a | D | D | D | D | D | D | D | D | X | X | U |
| 30 | n/a | n/a | D | D | D | D | D | D | D | X | X | X | U |

TABLE 8-continued

ECP-based slot format structure (Example 2)

| Format | | | 0 | 1 | 2 | 3 | 4 | 5 | 6 | 7 | 8 | 9 | 10 | 11 |
|---|---|---|---|---|---|---|---|---|---|---|---|---|---|---|
| 31 | n/a | n/a | D | D | D | D | D | D | D | D | D | X | U | U |
| 32 | n/a | n/a | D | D | D | D | D | D | D | D | X | X | U | U |
| 33 | n/a | n/a | D | D | D | D | D | D | D | X | X | X | U | U |
| 34 | n/a | n/a | U | U | U | U | U | U | U | U | U | U | U | U |
| 35 | n/a | n/a | X | U | U | U | U | U | U | U | U | U | U | U |
| 36 | n/a | n/a | D | X | U | U | U | U | U | U | U | U | U | U |
| 37 | n/a | n/a | X | U | U | U | U | U | U | U | U | U | U | U |
| 38 | n/a | n/a | X | X | U | U | U | U | U | U | U | U | U | U |
| 39 | n/a | n/a | D | X | X | U | U | U | U | U | U | U | U | U |
| 40 | n/a | n/a | X | X | U | U | U | U | U | U | U | U | U | U |
| 41 | n/a | n/a | X | X | X | U | U | U | U | U | U | U | U | U |
| 42 | n/a | n/a | D | X | X | X | U | U | U | U | U | U | U | U |
| 43 | n/a | n/a | D | D | D | D | D | D | D | X | X | X | X | U |
| 44 | n/a | n/a | D | D | D | D | X | X | X | X | X | X | U | U |
| 45 | n/a | n/a | D | D | D | D | X | X | U | U | U | U | U | U |
| 46 | n/a | n/a | D | D | D | D | X | D | D | D | D | D | D | X |
| 47 | n/a | n/a | D | D | D | X | X | D | D | D | D | D | X | X |
| 48 | n/a | n/a | X | X | X | X | X | D | D | X | X | X | X | X |
| 49 | n/a | n/a | X | X | X | X | X | D | X | X | X | X | X | X |
| 50 | n/a | n/a | U | U | U | U | U | X | U | U | U | U | U | U |
| 51 | n/a | n/a | U | U | U | U | U | X | X | U | U | U | U | U |
| 52 | n/a | n/a | X | U | U | U | U | X | X | X | U | U | U | U |
| 53 | n/a | n/a | X | X | U | U | U | X | X | X | X | U | U | U |
| 54 | n/a | n/a | D | D | D | X | U | D | D | D | D | D | X | U |
| 55 | n/a | n/a | X | U | U | U | U | D | D | X | U | U | U | U |
| 56 | n/a | n/a | U | U | U | U | U | D | X | U | U | U | U | U |
| 57 | n/a | n/a | D | D | X | X | U | D | D | D | D | X | X | U |
| 58 | n/a | n/a | X | X | U | U | U | D | D | X | X | U | U | U |
| 59 | n/a | n/a | X | U | U | U | U | D | X | X | U | U | U | U |
| 60 | n/a | n/a | X | X | X | X | U | D | X | X | X | X | X | U |
| 61 | n/a | n/a | X | X | X | X | U | D | D | X | X | X | X | U |
| 62-255 | | | | | | | Reserved | | | | | | | |

TABLE 8-1

ECP-based slot format structure (Example 3)

| Format | 0 | 1 | 2 | 3 | 4 | 5 | 6 | 7 | 8 | 9 | 10 | 11 |
|---|---|---|---|---|---|---|---|---|---|---|---|---|
| 0 | D | D | D | n/a | D | D | D | D | D | n/a | D | D | D |
| 1 | U | U | U | n/a | U | U | U | U | U | n/a | U | U | U |
| 2 | X | X | X | n/a | X | X | X | X | X | n/a | X | X | X |
| 3 | D | D | D | n/a | D | D | D | D | D | n/a | D | D | X |
| 4 | D | D | D | n/a | D | D | D | D | D | n/a | D | X | X |
| 5 | D | D | D | n/a | D | D | D | D | D | n/a | X | X | X |
| 6 | D | D | D | n/a | D | D | D | D | D | n/a | X | X | X |
| 7 | D | D | D | n/a | D | D | D | D | X | n/a | X | X | X |
| 8 | X | X | X | n/a | X | X | X | X | X | n/a | X | X | U |
| 9 | X | X | X | n/a | X | X | X | X | X | n/a | X | U | U |
| 10 | X | U | U | n/a | U | U | U | U | U | n/a | U | U | U |
| 11 | X | X | U | n/a | U | U | U | U | U | n/a | U | U | U |
| 12 | X | X | X | n/a | U | U | U | U | U | n/a | U | U | U |
| 13 | X | X | X | n/a | U | U | U | U | U | n/a | U | U | U |
| 14 | X | X | X | n/a | X | U | U | U | U | n/a | U | U | U |
| 15 | X | X | X | n/a | X | X | U | U | U | n/a | U | U | U |
| 16 | D | X | X | n/a | X | X | X | X | X | n/a | X | X | X |
| 17 | D | D | X | n/a | X | X | X | X | X | n/a | X | X | X |
| 18 | D | D | D | n/a | X | X | X | X | X | n/a | X | X | X |
| 19 | D | X | X | n/a | X | X | X | X | X | n/a | X | X | U |
| 20 | D | D | X | n/a | X | X | X | X | X | n/a | X | X | U |
| 21 | D | D | D | n/a | X | X | X | X | X | n/a | X | X | U |
| 22 | D | X | X | n/a | X | X | X | X | X | n/a | X | U | U |
| 23 | D | D | X | n/a | X | X | X | X | X | n/a | X | U | U |
| 24 | D | D | D | n/a | X | X | X | X | X | n/a | X | U | U |
| 25 | D | X | X | n/a | X | X | X | X | X | n/a | U | U | U |
| 26 | D | D | X | n/a | X | X | X | X | X | n/a | U | U | U |
| 27 | D | D | D | n/a | X | X | X | X | X | n/a | U | U | U |
| 28 | D | D | D | n/a | D | D | D | D | D | n/a | D | X | U |
| 29 | D | D | D | n/a | D | D | D | D | D | n/a | X | X | U |

TABLE 8-1-continued

ECP-based slot format structure (Example 3)

| Format | \multicolumn{12}{c}{Symbol number (or index) within one slot} | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 30 | D | D | D | n/a | D | D | D | D | D | D | n/a | X | X | U |
| 31 | D | D | D | n/a | D | D | D | D | D | D | n/a | X | U | U |
| 32 | D | D | D | n/a | D | D | D | D | D | D | n/a | X | U | U |
| 33 | D | D | D | n/a | D | D | D | D | D | X | n/a | X | U | U |
| 34 | D | X | U | n/a | U | U | U | U | U | U | n/a | U | U | U |
| 35 | D | D | X | n/a | U | U | U | U | U | U | n/a | U | U | U |
| 36 | D | D | D | n/a | U | U | U | U | U | U | n/a | U | U | U |
| 37 | D | X | X | n/a | U | U | U | U | U | U | n/a | U | U | U |
| 38 | D | D | X | n/a | U | U | U | U | U | U | n/a | U | U | U |
| 39 | D | D | D | n/a | X | U | U | U | U | U | n/a | U | U | U |
| 40 | D | X | X | n/a | U | U | U | U | U | U | n/a | U | U | U |
| 41 | D | D | X | n/a | X | U | U | U | U | U | n/a | U | U | U |
| 42 | D | D | D | n/a | X | X | U | U | U | U | n/a | U | U | U |
| 43 | D | D | D | n/a | D | D | D | D | D | X | n/a | X | X | U |
| 44 | D | D | D | n/a | D | D | X | X | X | X | n/a | X | U | U |
| 45 | D | D | D | n/a | D | D | X | X | U | U | n/a | U | U | U |
| 46 | D | D | D | n/a | D | D | X | D | D | D | n/a | D | D | X |
| 47 | D | D | D | n/a | D | X | X | D | D | D | n/a | D | X | X |
| 48 | D | D | X | n/a | X | X | X | D | D | X | n/a | X | X | X |
| 49 | D | X | X | n/a | X | X | X | D | X | X | n/a | X | X | X |
| 50 | X | U | U | n/a | U | U | U | X | U | U | n/a | U | U | U |
| 51 | X | X | U | n/a | U | U | U | X | X | U | n/a | U | U | U |
| 52 | X | X | X | n/a | U | U | U | X | X | X | n/a | U | U | U |
| 53 | X | X | X | n/a | U | U | U | X | X | X | n/a | U | U | U |
| 54 | D | D | D | n/a | D | X | U | D | D | D | n/a | D | X | U |
| 55 | D | D | X | n/a | U | U | U | D | D | X | n/a | U | U | U |
| 56 | D | X | U | n/a | U | U | U | D | X | U | n/a | U | U | U |
| 57 | D | D | D | n/a | X | X | U | D | D | D | n/a | X | X | U |
| 58 | D | D | X | n/a | U | U | U | D | D | X | n/a | U | U | U |
| 59 | D | X | X | n/a | U | U | U | D | X | X | n/a | U | U | U |
| 60 | D | X | X | n/a | X | X | U | D | X | X | n/a | X | X | U |
| 61 | D | D | X | n/a | X | X | U | D | D | X | n/a | X | X | U |
| 62-255 | \multicolumn{13}{c}{Reserved} | | | | | | | | | | | | |

Table 8 shows the values corresponding to the symbol numbers 0 and 1 in the erased form in the NCP-based slot format structure. Table 8-1 shows the values corresponding to the symbol numbers 3 and 10 in the erased form in the NCP-based slot format structure. Compared to Table 4, even when the terminal receives the same slot format number by the SFI, it may be possible to determine the slot format structure information differently according to the CP information previously configured in the higher layer signaling. For example, when the slot format information 58 is received by the SFI, the slot format in the NCP structure is the same as shown in Table 9 below.

TABLE 9

Values of slot format information 58 applied in NCP-based slot format

| Format | \multicolumn{14}{c}{Symbol number (or index) within one slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 58 | D | D | X | X | U | U | U | D | D | X | X | U | U | U |

The slot format in the ECP structure is shown in Table 10 below.

TABLE 10

Value of slot format information 58 applied in ECP-based slot format

| Format | \multicolumn{12}{c}{Symbol number (or index) within one slot} | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 58 | X | X | U | U | U | D | D | X | X | U | U | U |

In general, the first method (the method of reusing the NCP-based slot format structure) means that the method of erasing the values of two specific columns (or symbol numbers or symbol indexes) in the NCP-based slot format structure and using the remaining values is used as the ECP-based slot format structure.

FIG. 3 illustrates a process of mapping to the ECP-based slot format structure through the NCP-based slot format structure. It can be seen that the symbol number (or symbol index) of an NCP-based slot format structure 320 is mapped to the symbol number (or symbol index) of an ECP-based slot format structure 322. Referring to FIG. 3, symbol numbers 0, 2, 3, 4, 5, 6, 7, 8, 10, 11, 12, and 13 of the NCP-based slot format structure are mapped to k0, k1, k2, k3, k4, k5, k6, k7, k8, k9, k10, and k11, respectively. k0, k1, k2, k3, k4, k5, k6, k7, k8, k9, k10, and k11 mean the symbol numbers (or symbol indexes) having a value between 0 to 11 in the ECP-based slot format structure and have different values (or some may have the same values). Although the one-to-one mapping relationship is shown in FIG. 3, one-to-many mapping may be sufficiently possible. For example, symbol number 1 of the NCP-based slot format structure may be simultaneously mapped to symbol numbers k2 and k4 of the ECP-based slot format structure. The meaning of this mapping is that the symbol information configuration of each format number applied to a specific symbol number of the NCP-based slot format structure is directly applied to symbol information of each format number applied to a specific symbol number of the ECP-based slot format structure. For example, when the symbol number 2 of the NCP-based slot format structure is mapped to the symbol number 3 of the ECP-based slot format structure, the following mapping relationship shown in Table 11 may be sufficiently applied. In a case where the ECP is set to the terminal-common or terminal-specific higher layer signaling, upon reception of the SFI information through DL control information, the terminal may be able to expect to use the values obtained by applying the ECP-based slot format structure to (mapping again in ascending order from 0) the remaining 12 symbol numbers except for two specific symbol numbers (among 14 symbol numbers) in the NCP-based slot format structure.

TABLE 11

Method of mapping ECP-based slot format information based on NCP-based slot format information (Example)

| Symbol number (or index) within one slot based on NCP | | Symbol number (or index) within one slot based on ECP | |
|---|---|---|---|
| Format | 2 | Format | 3 |
| 0 | D | ⇒ 0 | D |
| 1 | U | 1 | U |
| 2 | X | 2 | X |
| 3 | D | 3 | D |
| 4 | D | 4 | D |
| 5 | D | 5 | D |
| 6 | D | 6 | D |
| 7 | D | 7 | D |
| 8 | X | 8 | X |
| 9 | X | 9 | X |
| 10 | U | 10 | U |
| 11 | U | 11 | U |
| 12 | X | 12 | X |
| 13 | X | 13 | X |
| 14 | X | 14 | X |
| 15 | X | 15 | X |
| 16 | X | 16 | X |
| 17 | X | 17 | X |
| 18 | D | 18 | D |
| 19 | X | 19 | X |
| 20 | X | 20 | X |
| 21 | D | 21 | D |
| 22 | X | 22 | X |
| 23 | X | 23 | X |
| 24 | D | 24 | D |
| 25 | X | 25 | X |
| 26 | X | 26 | X |
| 27 | D | 27 | D |
| 28 | D | 28 | D |
| 29 | D | 29 | D |
| 30 | D | 30 | D |
| 31 | D | 31 | D |
| 32 | D | 32 | D |
| 33 | D | 33 | D |
| 34 | U | 34 | U |
| 35 | X | 35 | X |
| 36 | D | 36 | D |
| 37 | X | 37 | X |
| 38 | X | 38 | X |
| 39 | D | 39 | D |
| 40 | X | 40 | X |
| 41 | X | 41 | X |
| 42 | D | 42 | D |
| 43 | D | 43 | D |
| 44 | D | 44 | D |
| 45 | D | 45 | D |
| 46 | D | 46 | D |
| 47 | D | 47 | D |
| 48 | X | 48 | X |
| 49 | X | 49 | X |
| 50 | U | 50 | U |
| 51 | U | 51 | U |
| 52 | X | 52 | X |
| 53 | X | 53 | X |
| 54 | D | 54 | D |
| 55 | X | 55 | X |
| 56 | U | 56 | U |
| 57 | D | 57 | D |
| 58 | X | 58 | X |
| 59 | X | 59 | X |
| 60 | X | 60 | X |
| 61 | X | 61 | X |
| 62-255 | Reserved | 62-255 | Reserved |

The second method is a method of changing and using the NCP-based slot format structure. In the first method, there is no change in the symbol configuration information in which the symbol number is applied to the NCP-based slot format number by mapping the symbol number of the NCP-based slot format to the symbol number of the ECP-based slot format, but there may occur a problem that two or more specific format numbers indicate the same slot structure in the ECP-based slot format structure. For example, in Table 5, the slot format number 8 and slot format number 9 indicate the same slot configuration information. As described above, the method of providing the ECP-based slot format structure from which slot format information having the same slot structure is erased may be sufficiently possible.

The rules for providing such a method are as follows.

1) First, as in the first method, two specific symbol numbers are erased from the NCP-based slot format structure and the remaining 12 symbol numbers are used as the basis of the ECP-based slot format structure (Table 12 indicates an example considering a case where columns 12 and 13 are excluded).

TABLE 12

Examples according to rule 1)

| | Symbol number (or index) within one slot | | | | | | | | | | | | |
|---|---|---|---|---|---|---|---|---|---|---|---|---|---|
| Format | 0 | 1 | 2 | 3 | 4 | 5 | 6 | 7 | 8 | 9 | 10 | 11 | |
| 0 | D | D | D | D | D | D | D | D | D | D | D | D | n/a n/a |
| 1 | U | U | U | U | U | U | U | U | U | U | U | U | n/a n/a |
| 2 | X | X | X | X | X | X | X | X | X | X | X | X | n/a n/a |

TABLE 12-continued

Examples according to rule 1)

| Format | \multicolumn{12}{c}{Symbol number (or index) within one slot} | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | | |
| 3 | D | D | D | D | D | D | D | D | D | D | D | D | n/a | n/a |
| 4 | D | D | D | D | D | D | D | D | D | D | D | D | n/a | n/a |
| 5 | D | D | D | D | D | D | D | D | D | D | D | X | n/a | n/a |
| 6 | D | D | D | D | D | D | D | D | D | D | X | X | n/a | n/a |
| 7 | D | D | D | D | D | D | D | D | X | X | X | X | n/a | n/a |
| 8 | X | X | X | X | X | X | X | X | X | X | X | X | n/a | n/a |
| 9 | X | X | X | X | X | X | X | X | X | X | X | X | n/a | n/a |
| 10 | X | U | U | U | U | U | U | U | U | U | U | U | n/a | n/a |
| 11 | X | X | U | U | U | U | U | U | U | U | U | U | n/a | n/a |
| 12 | X | X | X | U | U | U | U | U | U | U | U | U | n/a | n/a |
| 13 | X | X | X | X | U | U | U | U | U | U | U | U | n/a | n/a |
| 14 | X | X | X | X | X | U | U | U | U | U | U | U | n/a | n/a |
| 15 | X | X | X | X | X | X | U | U | U | U | U | U | n/a | n/a |
| 16 | D | X | X | X | X | X | X | X | X | X | X | X | n/a | n/a |
| 17 | D | D | X | X | X | X | X | X | X | X | X | X | n/a | n/a |
| 18 | D | D | D | X | X | X | X | X | X | X | X | X | n/a | n/a |
| 19 | D | X | X | X | X | X | X | X | X | X | X | X | n/a | n/a |
| 20 | D | D | X | X | X | X | X | X | X | X | X | X | n/a | n/a |
| 21 | D | D | D | X | X | X | X | X | X | X | X | X | n/a | n/a |
| 22 | D | X | X | X | X | X | X | X | X | X | X | X | n/a | n/a |
| 23 | D | D | X | X | X | X | X | X | X | X | X | X | n/a | n/a |
| 24 | D | D | D | X | X | X | X | X | X | X | X | X | n/a | n/a |
| 25 | D | X | X | X | X | X | X | X | X | X | X | U | n/a | n/a |
| 26 | D | D | X | X | X | X | X | X | X | X | X | U | n/a | n/a |
| 27 | D | D | D | X | X | X | X | X | X | X | X | U | n/a | n/a |
| 28 | D | D | D | D | D | D | D | D | D | D | D | D | n/a | n/a |
| 29 | D | D | D | D | D | D | D | D | D | D | D | X | n/a | n/a |
| 30 | D | D | D | D | D | D | D | D | D | D | X | X | n/a | n/a |
| 31 | D | D | D | D | D | D | D | D | D | D | D | X | n/a | n/a |
| 32 | D | D | D | D | D | D | D | D | D | D | X | X | n/a | n/a |
| 33 | D | D | D | D | D | D | D | D | D | X | X | X | n/a | n/a |
| 34 | D | X | U | U | U | U | U | U | U | U | U | U | n/a | n/a |
| 35 | D | D | X | U | U | U | U | U | U | U | U | U | n/a | n/a |
| 36 | D | D | D | X | U | U | U | U | U | U | U | U | n/a | n/a |
| 37 | D | X | X | U | U | U | U | U | U | U | U | U | n/a | n/a |
| 38 | D | D | X | X | U | U | U | U | U | U | U | U | n/a | n/a |
| 39 | D | D | D | X | X | U | U | U | U | U | U | U | n/a | n/a |
| 40 | D | X | X | X | U | U | U | U | U | U | U | U | n/a | n/a |
| 41 | D | D | X | X | X | U | U | U | U | U | U | U | n/a | n/a |
| 42 | D | D | D | X | X | X | U | U | U | U | U | U | n/a | n/a |
| 43 | D | D | D | D | D | D | D | D | D | X | X | X | n/a | n/a |
| 44 | D | D | D | D | D | D | X | X | X | X | X | X | n/a | n/a |
| 45 | D | D | D | D | D | D | X | X | U | U | U | U | n/a | n/a |
| 46 | D | D | D | D | D | D | X | D | D | D | D | D | n/a | n/a |
| 47 | D | D | D | D | D | X | X | D | D | D | D | D | n/a | n/a |
| 48 | D | D | X | X | X | X | X | D | D | X | X | X | n/a | n/a |
| 49 | D | X | X | X | X | X | X | D | X | X | X | X | n/a | n/a |
| 50 | X | U | U | U | U | U | U | X | U | U | U | U | n/a | n/a |
| 51 | X | X | U | U | U | U | U | X | X | U | U | U | n/a | n/a |
| 52 | X | X | X | U | U | U | U | X | X | X | U | U | n/a | n/a |
| 53 | X | X | X | X | U | U | U | X | X | X | X | U | n/a | n/a |
| 54 | D | D | D | D | D | X | U | D | D | D | D | D | n/a | n/a |
| 55 | D | D | X | U | U | U | U | D | D | X | U | U | n/a | n/a |
| 56 | D | X | U | U | U | U | U | D | X | U | U | U | n/a | n/a |
| 57 | D | D | D | D | X | X | U | D | D | D | D | X | n/a | n/a |
| 58 | D | D | X | X | U | U | U | D | D | X | X | U | n/a | n/a |
| 59 | D | X | X | U | U | U | U | D | X | X | U | U | n/a | n/a |
| 60 | D | X | X | X | X | X | U | D | X | X | X | X | n/a | n/a |
| 61 | D | D | X | X | X | X | U | D | D | X | X | X | n/a | n/a |
| 62-255 | \multicolumn{12}{c}{Reserved} | | | | | | | | | | | |

2) Then, the slot format numbers except for the smallest slot format number (or the largest number) among those having the same slot structure are erased (Table 13 considers, as an example, a case where all the slot format numbers except for the smallest slot format number are erased).

TABLE 13

Examples according to rule 2)

| Format | Symbol number (or index) within one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | n/a | n/a |
| 0 | D | D | D | D | D | D | D | D | D | D | D | D | n/a | n/a |
| 1 | U | U | U | U | U | U | U | U | U | U | U | U | n/a | n/a |
| 2 | X | X | X | X | X | X | X | X | X | X | X | X | n/a | n/a |
| 3 | D | D | D | D | D | D | D | D | D | D | D | D | n/a | n/a |
| | | | | | | | | | | | | | n/a | n/a |
| 5 | D | D | D | D | D | D | D | D | D | D | D | X | n/a | n/a |
| 6 | D | D | D | D | D | D | D | D | D | D | X | X | n/a | n/a |
| 7 | D | D | D | D | D | D | D | D | D | X | X | X | n/a | n/a |
| 8 | X | X | X | X | X | X | X | X | X | X | X | X | n/a | n/a |
| | | | | | | | | | | | | | n/a | n/a |
| 10 | X | U | U | U | U | U | U | U | U | U | U | U | n/a | n/a |
| 11 | X | X | U | U | U | U | U | U | U | U | U | U | n/a | n/a |
| 12 | X | X | X | U | U | U | U | U | U | U | U | U | n/a | n/a |
| 13 | X | X | X | X | U | U | U | U | U | U | U | U | n/a | n/a |
| 14 | X | X | X | X | X | U | U | U | U | U | U | U | n/a | n/a |
| 15 | X | X | X | X | X | X | U | U | U | U | U | U | n/a | n/a |
| 16 | D | X | X | X | X | X | X | X | X | X | X | X | n/a | n/a |
| 17 | D | D | X | X | X | X | X | X | X | X | X | X | n/a | n/a |
| 18 | D | D | D | X | X | X | X | X | X | X | X | X | n/a | n/a |
| | | | | | | | | | | | | | n/a | n/a |
| | | | | | | | | | | | | | n/a | n/a |
| | | | | | | | | | | | | | n/a | n/a |
| | | | | | | | | | | | | | n/a | n/a |
| | | | | | | | | | | | | | n/a | n/a |
| | | | | | | | | | | | | | n/a | n/a |
| 25 | D | X | X | X | X | X | X | X | X | X | X | U | n/a | n/a |
| 26 | D | D | X | X | X | X | X | X | X | X | X | U | n/a | n/a |
| 27 | D | D | D | X | X | X | X | X | X | X | X | U | n/a | n/a |
| | | | | | | | | | | | | | n/a | n/a |
| | | | | | | | | | | | | | n/a | n/a |
| | | | | | | | | | | | | | n/a | n/a |
| | | | | | | | | | | | | | n/a | n/a |
| | | | | | | | | | | | | | n/a | n/a |
| | | | | | | | | | | | | | n/a | n/a |
| 34 | D | X | U | U | U | U | U | U | U | U | U | U | n/a | n/a |
| 35 | D | D | X | U | U | U | U | U | U | U | U | U | n/a | n/a |
| 36 | D | D | D | X | U | U | U | U | U | U | U | U | n/a | n/a |
| 37 | D | X | X | U | U | U | U | U | U | U | U | U | n/a | n/a |
| 38 | D | D | X | X | U | U | U | U | U | U | U | U | n/a | n/a |
| 39 | D | D | D | X | X | U | U | U | U | U | U | U | n/a | n/a |
| 40 | D | X | X | X | U | U | U | U | U | U | U | U | n/a | n/a |
| 41 | D | D | X | X | X | U | U | U | U | U | U | U | n/a | n/a |
| 42 | D | D | D | X | X | X | U | U | U | U | U | U | n/a | n/a |
| | | | | | | | | | | | | | n/a | n/a |
| 44 | D | D | D | D | D | D | X | X | X | X | X | X | n/a | n/a |
| 45 | D | D | D | D | D | D | X | X | U | U | U | U | n/a | n/a |
| 46 | D | D | D | D | D | D | X | D | D | D | D | D | n/a | n/a |
| 47 | D | D | D | D | D | X | X | D | D | D | D | D | n/a | n/a |
| 48 | D | D | X | X | X | X | X | D | D | X | X | X | n/a | n/a |
| 49 | D | X | X | X | X | X | X | D | X | X | X | X | n/a | n/a |
| 50 | X | U | U | U | U | U | U | X | U | U | U | U | n/a | n/a |
| 51 | X | X | U | U | U | U | U | X | X | U | U | U | n/a | n/a |
| 52 | X | X | X | U | U | U | U | X | X | X | U | U | n/a | n/a |
| 53 | X | X | X | X | U | U | U | X | X | X | X | U | n/a | n/a |
| 54 | D | D | D | D | D | X | U | D | D | D | D | D | n/a | n/a |
| 55 | D | D | X | U | U | U | U | D | D | X | U | U | n/a | n/a |
| 56 | D | X | U | U | U | U | U | D | X | U | U | U | n/a | n/a |
| 57 | D | D | D | X | X | U | U | D | D | D | X | X | n/a | n/a |
| 58 | D | D | X | X | U | U | U | D | D | X | X | U | n/a | n/a |
| 59 | D | X | X | U | U | U | U | D | X | X | U | U | n/a | n/a |
| 60 | D | X | X | X | X | U | D | X | X | X | X | U | n/a | n/a |
| 61 | D | D | X | X | X | U | D | D | X | X | X | U | n/a | n/a |
| 62-255 | Reserved | | | | | | | | | | | | | |

Then, the slot format numbers excluded in rule 2) are reallocated to the other slot format numbers in ascending order. (Alternatively, the slot format number in rule 2) is allocated as reserved) (Table 14 indicates an example considering reallocating slot format numbers excluded in rule 2) to other slot format numbers).

TABLE 14

Examples according to rule 3)

| Format | Symbol number (or index) within one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | n/a | n/a |
| 0 | D | D | D | D | D | D | D | D | D | D | D | D | n/a | n/a |
| 1 | U | U | U | U | U | U | U | U | U | U | U | U | n/a | n/a |
| 2 | X | X | X | X | X | X | X | X | X | X | X | X | n/a | n/a |
| 3 | D | D | D | D | D | D | D | D | D | D | D | X | n/a | n/a |
| 4 | D | D | D | D | D | D | D | D | D | D | X | X | n/a | n/a |
| 5 | D | D | D | D | D | D | D | D | D | X | X | X | n/a | n/a |
| 6 | X | X | X | X | X | X | X | X | X | X | X | X | n/a | n/a |
| 7 | X | U | U | U | U | U | U | U | U | U | U | U | n/a | n/a |
| 8 | X | X | U | U | U | U | U | U | U | U | U | U | n/a | n/a |
| 9 | X | X | X | U | U | U | U | U | U | U | U | U | n/a | n/a |
| 10 | X | X | X | X | U | U | U | U | U | U | U | U | n/a | n/a |
| 11 | X | X | X | X | X | U | U | U | U | U | U | U | n/a | n/a |
| 12 | X | X | X | X | X | X | U | U | U | U | U | U | n/a | n/a |
| 13 | D | X | X | X | X | X | X | X | X | X | X | X | n/a | n/a |
| 14 | D | D | X | X | X | X | X | X | X | X | X | X | n/a | n/a |
| 15 | D | D | D | X | X | X | X | X | X | X | X | X | n/a | n/a |
| 16 | D | X | X | X | X | X | X | X | X | X | X | U | n/a | n/a |
| 17 | D | D | X | X | X | X | X | X | X | X | X | U | n/a | n/a |
| 18 | D | D | D | X | X | X | X | X | X | X | X | U | n/a | n/a |
| 19 | D | X | U | U | U | U | U | U | U | U | U | U | n/a | n/a |
| 20 | D | D | X | U | U | U | U | U | U | U | U | U | n/a | n/a |
| 21 | D | D | D | X | U | U | U | U | U | U | U | U | n/a | n/a |
| 22 | D | X | X | U | U | U | U | U | U | U | U | U | n/a | n/a |
| 23 | D | D | X | X | U | U | U | U | U | U | U | U | n/a | n/a |
| 24 | D | D | D | X | X | U | U | U | U | U | U | U | n/a | n/a |
| 25 | D | X | X | X | U | U | U | U | U | U | U | U | n/a | n/a |
| 26 | D | D | X | X | X | U | U | U | U | U | U | U | n/a | n/a |
| 27 | D | D | D | X | X | X | U | U | U | U | U | U | n/a | n/a |
| 28 | D | D | D | D | D | D | X | X | X | X | X | X | n/a | n/a |
| 29 | D | D | D | D | D | D | X | X | U | U | U | U | n/a | n/a |
| 30 | D | D | D | D | D | D | X | D | D | D | D | D | n/a | n/a |
| 31 | D | D | D | D | D | X | X | D | D | D | D | D | n/a | n/a |
| 32 | D | D | X | X | X | X | X | D | D | X | X | X | n/a | n/a |
| 33 | D | X | X | X | X | X | D | X | X | X | X | X | n/a | n/a |
| 34 | X | U | U | U | U | U | U | X | U | U | U | U | n/a | n/a |
| 35 | X | X | U | U | U | U | U | X | U | U | U | U | n/a | n/a |
| 36 | X | X | X | U | U | U | U | X | X | U | U | U | n/a | n/a |
| 37 | X | X | X | X | U | U | U | X | X | X | U | U | n/a | n/a |
| 38 | D | D | D | D | D | X | U | D | D | D | D | D | n/a | n/a |
| 39 | D | D | X | U | U | U | U | D | D | X | U | U | n/a | n/a |
| 40 | D | X | U | U | U | U | U | D | X | U | U | U | n/a | n/a |
| 41 | D | D | D | D | X | X | U | D | D | D | D | X | n/a | n/a |
| 42 | D | D | X | X | U | U | U | D | D | X | X | U | n/a | n/a |
| 43 | D | X | X | U | U | U | U | D | X | X | U | U | n/a | n/a |
| 44 | D | X | X | X | X | X | U | D | X | X | X | X | n/a | n/a |
| 45 | D | D | X | X | X | X | U | D | D | X | X | X | n/a | n/a |
| 46-255 | Reserved | | | | | | | | | | | | | |

For example, the structure derived by applying these rules may be sufficiently used as the ECP-based slot format structure.

The third method (the method of providing the ECP-based slot format structure) is to use a new format structure rather than reusing or modifying the NCP-based slot format structure. The following rules may be applied as the method of considering the new ECP-based slot format structure.

Considering that all symbols are DL, UL, or flexible link

Case where switching from DL to UL is possible only once

Consider up to three DL symbols for short consecutive DLs

Consider up to two UL symbols for short consecutive ULs

Consider up to three flexible link symbols for short consecutive flexible links

Case where only DL and flexible link configuration exists

Case where there are many DL symbols: The flexible link symbol starts at symbol numbers 9, 10, and 11 and ends at symbol number 11

Case where there are many flexible link symbols: The flexible link symbol starts at symbol numbers 1, 2, and 3 and ends at symbol number 11

Case where only UL and flexible link configuration exists

Case where there are many UL symbols: The flexible link symbol starts at symbol number 0 and ends at symbol numbers 0, 1, 2, 3, 4, and 5

Case where there are many flexible link symbols: The flexible link symbol starts at symbol number 0 and ends at symbol numbers 9 and 10

Case where UL, DL, and flexible link configuration exists

Case where there are many DL symbols: The flexible link symbols are positioned at symbol numbers {10}, {9, 10}, {8, 9, 10}, {9}, {8, 9}, and {7, 8, 9}

Case where there are many flexible link symbols: The flexible link symbols start at symbol numbers 1, 2, and 3 and end at symbol numbers 9 and 10

Case where there are many UL symbols: The flexible link symbols are positioned at symbol numbers {1}, {2}, {3}, {1,2}, {2,3}, {3,4}, {1, 2, 3}, {2, 3, 4}, and {3, 4, 5}

Pattern matched to LTE structure {DL-UL-Flexible}: {8-3-1}, {5-5-2}, {5-2-5}

Otherwise: three symbols for DL at the slot start point, three symbols for UL at the slot end point Case where switching from DL to UL is possible twice Consider symmetrical structure For short consecutive DLs, consider up to two DL symbols For short consecutive ULs, consider up to one UL symbol For short consecutive flexible links, consider up to two flexible link symbols Considering these criteria, it may be possible to consider the ECP-based slot format structure as in Table 15.

TABLE 15

ECP-based slot format structure

| Format | Symbol number (or index) within one slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | D | D | D | D | D | D | D | D | D | D | D | D |
| 1 | U | U | U | U | U | U | U | U | U | U | U | U |
| 2 | X | X | X | X | X | X | X | X | X | X | X | X |
| 3 | D | D | D | D | D | D | D | D | D | D | D | X |
| 4 | D | D | D | D | D | D | D | D | D | D | X | X |
| 5 | D | D | D | D | D | D | D | D | D | X | X | X |
| 6 | D | D | D | D | D | D | D | D | X | X | X | X |
| 7 | D | D | D | D | D | D | D | X | X | X | X | X |
| 8 | X | X | X | X | X | X | X | X | X | X | X | U |
| 9 | X | X | X | X | X | X | X | X | X | X | U | U |
| 10 | X | X | X | X | X | X | X | X | X | U | U | U |
| 11 | X | U | U | U | U | U | U | U | U | U | U | U |
| 12 | X | X | U | U | U | U | U | U | U | U | U | U |
| 13 | X | X | X | U | U | U | U | U | U | U | U | U |
| 14 | X | X | X | X | U | U | U | U | U | U | U | U |
| 15 | X | X | X | X | X | U | U | U | U | U | U | U |
| 16 | X | X | X | X | X | X | U | U | U | U | U | U |
| 17 | D | X | X | X | X | X | X | X | X | X | X | X |
| 18 | D | D | X | X | X | X | X | X | X | X | X | X |
| 19 | D | D | D | X | X | X | X | X | X | X | X | X |
| 20 | D | X | X | X | X | X | X | X | X | X | X | U |
| 21 | D | D | X | X | X | X | X | X | X | X | X | U |
| 22 | D | D | D | X | X | X | X | X | X | X | X | U |
| 23 | D | X | X | X | X | X | X | X | X | X | U | U |
| 24 | D | D | X | X | X | X | X | X | X | X | U | U |
| 25 | D | D | D | X | X | X | X | X | X | X | U | U |
| 26 | D | X | X | X | X | X | X | X | X | U | U | U |
| 27 | D | D | X | X | X | X | X | X | X | U | U | U |
| 28 | D | D | D | X | X | X | X | X | X | U | U | U |
| 29 | D | D | D | D | D | D | D | D | D | D | X | U |
| 30 | D | D | D | D | D | D | D | D | D | X | X | U |
| 31 | D | D | D | D | D | D | D | D | X | X | X | U |
| 32 | D | D | D | D | D | D | D | D | X | U | U | U |
| 33 | D | D | D | D | D | D | D | X | X | U | U | U |
| 34 | D | D | D | D | D | D | X | X | X | U | U | U |
| 35 | D | X | U | U | U | U | U | U | U | U | U | U |
| 36 | D | D | X | U | U | U | U | U | U | U | U | U |
| 37 | D | D | D | X | U | U | U | U | U | U | U | U |
| 38 | D | X | X | U | U | U | U | U | U | U | U | U |
| 39 | D | D | X | X | U | U | U | U | U | U | U | U |
| 40 | D | D | D | X | X | U | U | U | U | U | U | U |
| 41 | D | X | X | X | U | U | U | U | U | U | U | U |
| 42 | D | D | X | X | X | U | U | U | U | U | U | U |
| 43 | D | D | D | X | X | X | U | U | U | U | U | U |
| 44 | D | D | D | D | D | D | D | X | X | X | U | U |
| 45 | D | D | D | D | D | X | X | X | X | X | U | U |
| 46 | D | D | D | D | X | X | X | X | X | X | U | U |
| 47 | D | D | D | D | X | D | D | D | D | X | X | X |
| 48 | D | D | D | D | X | X | D | D | D | D | X | X |
| 49 | D | D | X | X | X | X | D | X | X | X | X | X |
| 50 | D | X | X | X | X | X | D | X | X | X | X | X |
| 51 | X | U | U | U | U | U | X | U | U | U | U | U |
| 52 | X | X | U | U | U | U | X | X | U | U | U | U |
| 53 | X | X | X | U | U | U | X | X | X | U | U | U |
| 54 | X | X | X | X | U | U | X | X | X | X | U | U |
| 55 | D | D | D | D | X | U | D | D | D | D | X | U |
| 56 | D | D | X | U | U | U | D | D | X | U | U | U |
| 57 | D | D | D | X | X | U | D | D | D | X | X | U |
| 58 | D | D | X | U | U | U | D | D | X | U | U | U |
| 59 | D | X | X | U | U | U | D | X | X | U | U | U |
| 60 | D | X | X | X | U | D | X | X | X | X | U | U |
| 61 | D | D | X | X | X | U | D | D | X | X | X | U |
| 62-255 | Reserved | | | | | | | | | | | |

When the NCP is set to the terminal by the terminal-common or terminal-specific higher layer signaling, the terminal expects not to receive the control information including the SFI information (or the CRC scrambled with the RNTI related to the SFI) taking into account the ECP-based slot format structure. Alternatively, when the NCP is set to the terminal by the terminal-common or terminal-specific higher layer signaling, the terminal expects to receive the control information including the SFI information (or the CRC scrambled with the RNTI related to the SFI) taking into account the NCP-based slot format structure.

When the ECP is set to the terminal by the terminal-common or terminal-specific higher layer signaling, the terminal expects not to receive the control information including the SFI information (or the CRC scrambled with the RNTI related to the SFI) taking into account the NCP-based slot format structure. Alternatively, when the ECP is set to the terminal by the terminal-common or terminal-specific higher layer signaling, the terminal expects to receive the control information including the SFI information (or the CRC scrambled with the RNTI related to the SFI) taking into account the ECP-based slot format structure.

When the terminal does not receive the configuration information related to the CP by the terminal-common or terminal-specific higher layer signaling, the terminal expects not to receive the control information including the SFI information (or the CRC scrambled with the RNTI related to the SFI) taking into account the NCP-based slot format structure. Alternatively, when the terminal does not receive the configuration information related to the CP by the terminal-common or terminal-specific higher layer signaling, the terminal expects to receive the control information including the SFI information (or the CRC scrambled with the RNTI related to the SFI) taking into account the ECP-based slot format structure.

Figure 4:
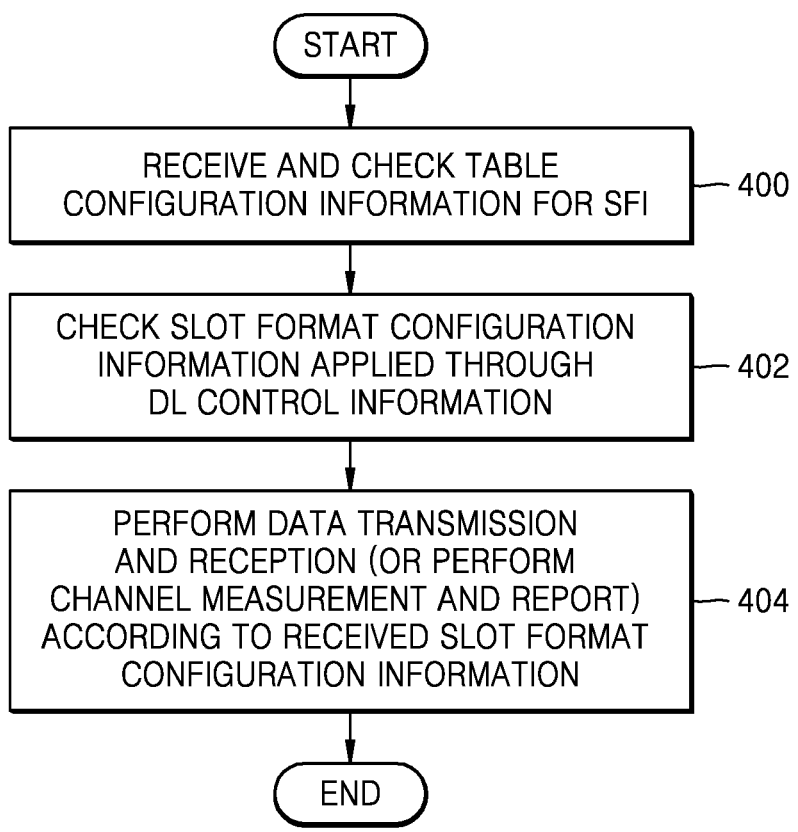
FIG. 4 is a flowchart of a method, performed by a terminal, of transmitting and receiving control information and data information based on reception of slot format indicator (SFI) information according to an embodiment of the disclosure.

FIG. 4 is a flowchart of a method, performed by a terminal, of transmitting and receiving control information and data information based on reception of SFI information according to an embodiment of the disclosure.

Referring to FIG. 4, when the slot format configuration information conforms to the values defined in the specification, or when there are multiple pieces of slot format configuration information, the terminal may be set to one of them through terminal-common or terminal-specific higher layer signaling at operation 400. The terminal may be set with the terminal-common DL control information region in which the SFI including the slot format configuration information is transmitted through the terminal-specific or terminal-common higher layer signaling. In addition, it is also possible to set the period in which the SFI is transmitted in the terminal-common DL control information region. Also, it is possible to set the size of the terminal-common DL control information including the type of information included in the SFI (for example, including the presence or absence of the slot format information for each carrier, taking into account the carrier set, or the presence or absence of carrier indication information) and the SFI information in the terminal-common DL control information region through the terminal-specific or terminal-common higher layer signaling.

The configuration of the SFI information may be designed as follows.

SFI type 1={Slot format configuration information for one carrier}

SFI type 2={Carrier indicator information+Slot format configuration information}

SFI type 3={Slot format configuration information for carrier a +Slot format configuration information for carrier b+ . . . +Slot format configuration information for carrier x}

The terminal searches for SFI information according to the set SFI configuration information and checks the slot format configuration information at operation 402. Data transmission and reception is performed according to the checked slot format configuration information at operation 404). Alternatively, it may be possible to perform related operations such as channel measurement, reference signal transmission, or channel measurement reporting at operation 404. In a situation in which the slot format information described with reference to FIG. 3 is utilized, when SFI information is transmitted in two or more slot periods, the method of informing two or more pieces of slot information is as follows.

1) Method of repeating indicated slot format for each slot period

2) Method of including SFI information for each slot in SFI information

3) Method of applying n pieces of SFI information to k slots

Method 1) is a method in which the same slot format is applied to a plurality of set slots. Method 2) is a method of applying different slot formats for each slot. The SFI type for supporting this may be defined as follows.

SFI type 4={Slot format configuration information for slot 1+Slot format configuration information for slot 2+ . . . +Slot format configuration information for slot k}

Method 3) means the SFI type of the modified method since there is a possibility that the size of the SFI will increase when there are many indicating slots (for example, 20 slots). In this example, n may be less than or equal to k. The SFI type may be defined as follows.

SFI type 5={SFI information 1, . . . , SFI information n}

The SFI applied to slot k according to SFI type 5 is SFI information i, and i is a mod(k/n) value.

Figure 5:
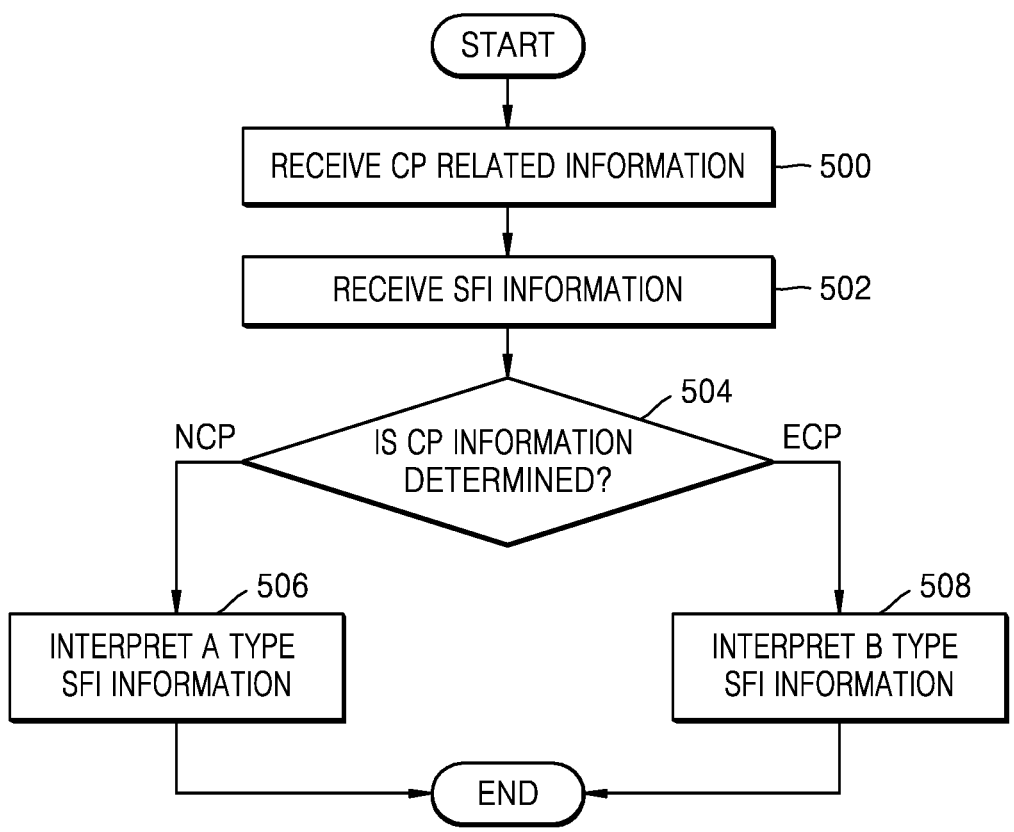
FIG. 5 is a flowchart of a method, performed by a terminal, of receiving a slot format indicator based on CP information according to an embodiment of the disclosure.

FIG. 5 is a flowchart of a method, performed by a terminal, of receiving an SFI based on CP information according to an embodiment of the disclosure.

Referring to FIG. 5, when the frequency band interval (bandwidth part (BWP)) is set after initial connection, the terminal may be configured with the start point of the PRB in the corresponding frequency band interval, the length of the corresponding frequency band interval, the subcarrier spacing of the corresponding frequency band, and the CP information of the corresponding frequency band through the terminal-common or terminal-specific higher layer signaling. The frequency band interval may correspond to both the UL and the DL. Alternatively, the CP information for the frequency band interval (or the system band interval) separately connected initially without configuring the frequency band interval may be configured through terminal-common or terminal-specific higher layer signaling. The terminal may be able to determine whether the set CP of the DL or UL bandwidth interval is an NCP or an ECP at operation 500.

As described with reference to FIG. 4, the terminal receives the SFI information in the terminal group common control region set for each specific slot period in the bandwidth interval at operation 502. The terminal determines the received SFI information interpretation based on the CP information at operation 504. When the CP information is the NCP, the terminal checks that the received SFI is transmitted based on the NCP-based slot format and interprets the slot configuration information accordingly at operation 506. When the CP information is the ECP, the terminal checks that the received SFI is transmitted based on the ECP-based slot format and interprets the slot configuration information accordingly at operation 508.

Figure 6:
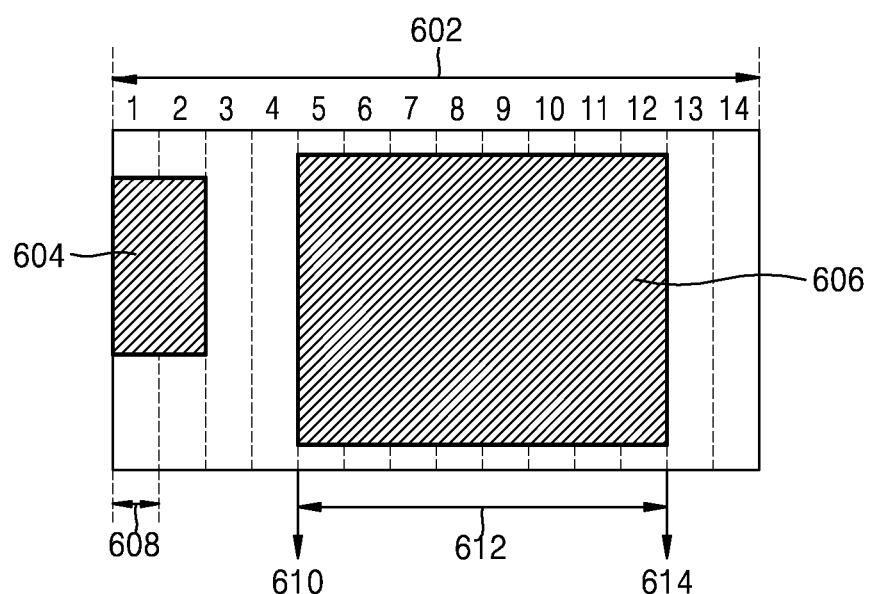
FIG. 6 is a diagram illustrating downlink control information (DCI) and UL or downlink (DL) data information resource allocation according to an embodiment of the disclosure.

FIG. 6 is a diagram illustrating DCI and UL or DL data information resource allocation, according to an embodiment of the disclosure.

Referring to FIG. 6, the BS may transmit the RNTI (for example, C-RNTI) including related information for scheduling DL data or UL data resource information and the DL control information including the scrambled CRC to the terminal through a terminal-common or terminal-specific control channel 604. When the terminal performs blind decoding for detecting the DL control information in the established terminal-common or terminal-specific control channel 604 and detects the DL control information, the terminal may determine, through the DL control information, to which resource the UL data resource or the DL data resource is allocated. FIG. 6 shows a situation in which a UL physical data resource or a DL physical data resource 606 of the terminal is allocated to the terminal. The terminal may determine whether the DL control information includes a certain frequency resource, a time resource for which the UL physical data resource or the DL physical data resource 606 is scheduled, through the DL control information detected in the terminal-common or terminal-specific control channel 604. The DL control information may include the following information.

Carrier indicator

Frequency band interval indicator

Frequency interval in which UL data or DL data is allocated

Distributing method (bitmap method), set method (start point and length indication method)

Time interval in which UL data or DL data is allocated

Start point and length indicator method (or start point and end point)

Reservation resource set indicator

Bundling size indicator

MCS, new data indicator (NDI), RV, HARQ process number, DAI

Code block group indicator, code block group discard indicator

HARQ Timing Indicator

Among these pieces of information, the time intervals 602 in which the UL data or the DL data is allocated show a data transmission start symbol 610 and a data transmission interval length 612, or a data transmission start symbol 610 and a data transmission end symbol 614 in FIG. 6. The description given with reference to FIG. 6 assumes a situation in which one slot is composed of 14 symbols in a situation in which an NCP is applied. In this situation, for example, as the DL data allocated to the terminal or the information of the time interval in which the DL data is allocated, the data transmission start symbol may be indicated by a fifth symbol, and the length of the data transmission interval may be indicated by 8 symbols. Alternatively, as the DL data allocated to the terminal or the information of the time interval in which the DL data is allocated, the data transmission start symbol may be indicated by a fifth symbol, and the data transmission end symbol may be indicated by a twelfth symbol.

The DL control information for the time resource allocation with respect to the UL data or the DL data may include the number of cross slot intervals set by the higher layer signaling, the start symbol and the symbol length of the data transmission interval, and the data resource mapping structure as in Table 16.

TABLE 16

Time resource information for data resource allocation

| Time resource allocation format | K0 (or K2) | Data transmission start symbol and transmission interval length (SLIV) | Data resource mapping structure |
|---|---|---|---|
| 1 | — | — | — |
| 2 | — | — | — |
| 3 | — | — | — |
| — | — | — | — |

In Table 16, K0 means a difference value between the slot number to which the DL control information instructing scheduling is transmitted and the slot number to which the DL data is scheduled by the DL control information at the time of DL data scheduling. For example, K0 may be composed of two or three bits. In Table 16, K2 means a difference value between the slot number to which the DL control information instructing scheduling is transmitted and the slot number to which the UL data is scheduled by the DL control information at the time of UL data scheduling. For example, when K2 is 1, it means that UL data information scheduled by the DL control information is transmitted in the slot immediately following the slot to which the DL control information is transmitted. For example, K0 may be composed of two or three bits.

In Table 16, the data resource mapping structure may be used to inform whether the position of the demodulation reference signal (DMRS) required for decoding the UL data or the DL data is positioned in the first symbol in the time resource region to which the data resource is allocated, or whether the position of the DMRS is positioned in the third or fourth symbol based on the NCP (or ECP)-based slot. For example, the data resource mapping structure may be composed of one or two bits.

In Table 16, the type of time resource allocation format may be set to an exponent value of 2, for example, 16 values may be set by higher layer signaling. Also, one of a plurality of numbers of the time resource allocation format configured through the DL control information may be indicated and transmitted to the terminal. The terminal may receive the specific time resource allocation format number through the DL control information and may determine the K0 value (or the K2 value), the SLIV value, and the data resource mapping structure type corresponding thereto.

In Table 16, it means a data transmission start symbol and an SLIV. For example, SLIV may be composed of six or seven bits. Equation 1 may be used to calculate the SLIV value. In Equation 1, L means the symbol length of the time resource region to which the UL data or DL data resource is allocated, and S means the start symbol value of the time resource region to which UL data or DL data resource is allocated. For reference, the SLIV value may be used to inform the time interval information to which the DL data physical resource or the UL data physical resource is allocated.

if $(L-1) \leq 7$ then $SLIV = 14 \times (L-1) + S$ else $SLIV = 14 \times (14-L+1) + (14-1-S)$ where $0 < L \leq 14 - S$  Equation 1

It is possible to derive the S and L values from the SLIV value itself, not by separately notifying the data transmission start symbol and the transmission symbol length through Equation 1. The terminal may receive the DL or UL data time resource allocation information therethrough.

Equation 1 may be an equation applied in the NCP-based slot structure in which one slot is composed of 14 OFDM symbols. When the ECP-based slot structure is configured by the terminal-common or terminal-specific higher layer signaling, the terminal may determine the SLIV value by applying Equation 2-1, Equation 2-2, Equation 2-3, Equation 2-4, or Equation 2-5.

if $(L-1) \leq 6$ then $SLIV = 12 \times (L-1) + S$ else $SLIV = 12 \times (12-L+1) + (12-1-S)$ where $0 < L \leq 12 - S$  Equation 2-1 if $(L-1) < 7$ then $SLIV = 12 \times (L-1) + S$ else $SLIV = 12 \times (12-L+1) + (12-1-S)$ where $0 < L \leq 12 - S$  Equation 2-2 if $(L-1) \leq 7$ then $SLIV = 12 \times (L-1) + S$ else $SLIV = 12 \times (14-L+1) + (14-1-S)$ where $0 < L \leq 12 - S$  Equation 2-3 if $(L-1) \leq 7$ then $SLIV = 14 \times (L-1) + S$ else $SLIV = 14 \times (14-L+1) + (12-1-S)$ where $0 < L \leq 12-S$  Equation 2-4 if $(L-1) \leq 7$ then $SLIV = 14 \times (L-1) + S$ else $SLIV = 14 \times (14-L+1) + (14-1-S)$ where $0 < L \leq 12-S$  Equation 2-5

When the NCP is configured by the terminal-common or terminal-specific higher layer signaling, the terminal may expect that the SLIV value is derived based on Equation 1. When the ECP is not configured by the terminal-common or terminal-specific higher layer signaling, the terminal may expect that the SLIV value is derived based on Equation 1. When the ECP is configured by the terminal-common or terminal-specific higher layer signaling, the terminal may expect that the SLIV value is derived based on Equation 2-1, Equation 2-2, Equation 2-3, Equation 2-4, or Equation 2-5.

if $(L-1) \leq K1$ then $SLIV = K2 \times (L-1) + S$ else $SLIV = 14 \times (K2-L+1) + (K2-1-S)$ where $0 < L \leq K2-S$  Equation 3-1

In Equation 3-1, the values of K1 and K2 may be differently determined depending on the set CP of the terminal. For example, when the NCP is configured by the terminal-common or terminal-specific higher layer signaling, the terminal may expect that the SLIV value to which a {K1=7, K2=14} value is applied is derived based on Equation 3-1. When the ECP is not configured by the terminal-common or terminal-specific higher layer signaling, the terminal may expect that the SLIV value to which a {K1=7, K2=14} value is applied is derived based on Equation 3-1. When the ECP is configured by the terminal-common or terminal-specific higher layer signaling, the terminal may expect that the SLIV value to which a {K1=6, K2=12} value is applied is derived based on Equation 3-1.

if $(L-1) \leq 7$ then $SLIV = 14 \times (L-1) + S$ else $SLIV = 14 \times (14-L+1) + (K3-1-S)$ where $0 < L \leq K3-S$  Equation 3-2

In Equation 3-2, the value of K3 may be differently determined depending on the set CP of the terminal. For example, when the NCP is configured by the terminal-common or terminal-specific higher layer signaling, the terminal may expect that the SLIV value to which a {K3=14} value is applied is derived based on Equation 3-2. When the ECP is not configured by the terminal-common or terminal-specific higher layer signaling, the terminal may expect that the SLIV value to which a {K3=14} value is applied is derived based on Equation 3-2. When the ECP is configured by the terminal-common or terminal-specific higher layer signaling, the terminal may expect that the SLIV value to which a {K3=12} value is applied is derived based on Equation 3-2.

if $(L-1) \leq 7$ then $SLIV = 14 \times (L-1) + S$ else $SLIV = 14 \times (14-L+1) + (14-1-S)$ where $0 < L \leq K4-S$  Equation 3-3

In Equation 3-3, the value of K4 may be differently determined depending on the set CP of the terminal. For example, when the NCP is configured by the terminal-common or terminal-specific higher layer signaling, the terminal may expect that the SLIV value to which a {K4=14} value is applied is derived based on Equation 3-3. When the ECP is not configured by the terminal-common or terminal-specific higher layer signaling, the terminal may expect that the SLIV value to which a {K4=14} value is applied is derived based on Equation 3-3. When the ECP is configured by the terminal-common or terminal-specific higher layer signaling, the terminal may expect that the SLIV value to which a {K4=12} value is applied is derived based on Equation 3-3.

In another example, the terminal may be able to use Equation 1 regardless of whether the terminal is configured with the NCP or the ECP through the terminal-common or terminal-specific higher layer signaling. In this situation, when the terminal is configured with the ECP by the terminal-common or terminal-specific higher layer signaling, the terminal may not expect that the UL data or DL data transmission interval scheduled beyond the slot boundary among the SLIV values derived from Equation 1 is scheduled. For example, when the DL data transmission interval start symbol through the SLIV value is 10th and the length of the DL data transmission interval is 3 symbols, the DL data resource allocation is possible within one slot since the NCP-based slot structure has 14 OFDM symbols. However, since the ECP-based slot structure has 12 OFDM symbols, the DL data resource allocation is not possible in one slot in the DL data transmission interval. DL data resource allocation occurs up to some symbols in a next slot. Therefore, the terminal does not expect to receive the SLIV value causing this situation.

As another example, when S has a value between 0 and 13 and L has a value between 1 and 14, the SLIV value available in the NCP-based situations may be in a range of 0 to 104. When the terminal receives the ECP-based configuration, the terminal may expect to receive the DL or UL data transmission interval indication from the available SLIV values except for the following value (candidate 1 or candidate 2).

[Candidate 1]

12, 13, 25, 26, 27, 38, 39, 40, 41, 51, 52, 53, 54, 64, 65, 66, 67, 77, 78, 79, 80, 90, 91, 92, 93, 103, 104

[Candidate 2]

12, 13, 25, 26, 27, 38, 39, 40, 41, 51, 52, 54, 55, 64, 65, 68, 69, 77, 78, 82, 83, 90, 91, 96, 97, 103, 104

Upon reception of the frequency band interval configuration information for the DL or UL, the situation in which the terminal is configured with the ECP or the NCP through the terminal-common or terminal-specific higher layer signaling may be included in the corresponding information and received by the terminal, or may be configured through separate signaling.

As another example, the terminal may be configured with whether the CP information is the ECP or the NCP, separately for the DL and the UL, through the terminal-common or terminal-specific higher layer signaling. The terminal may be configured with whether the CP information is the ECP or the NCP, at the same time as the DL and the UL, through the terminal-common or terminal-specific higher layer signaling.

As another example, when the frequency band interval is configured, the CP information that is one of parameters necessary for configuring the frequency band interval for the UL or the DL is configured together with the frequency band interval configuration. Therefore, the terminal may expect to determine to which CP information of the NCP and the ECP the corresponding frequency band interval is configured.

Figure 7:
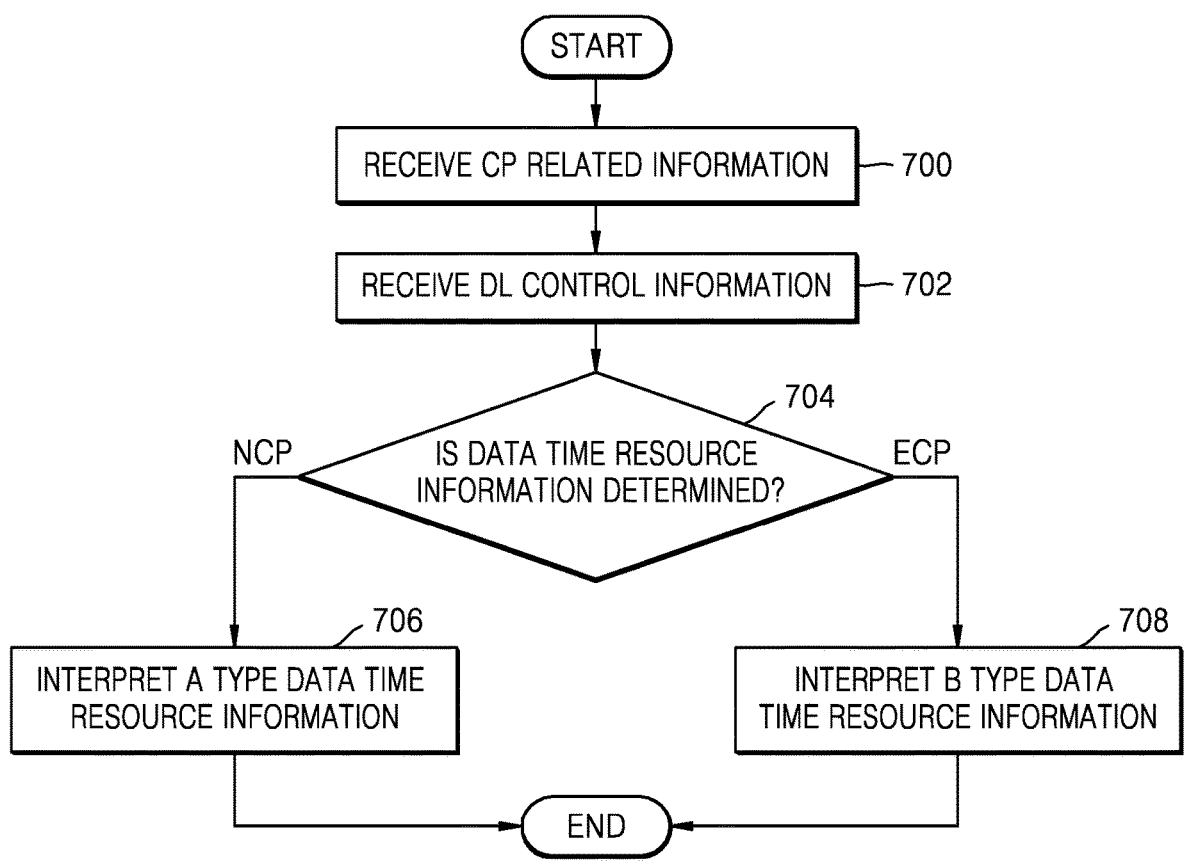
FIG. 7 is a flowchart of a method, performed by a terminal, of interpreting a DL or UL resource region based on CP information according to an embodiment of the disclosure.

FIG. 7 is a flowchart of a method, performed by a terminal, of interpreting a DL or UL resource region based on CP information according to an embodiment of the disclosure.

Referring to FIG. 7 the terminal previously receives the CP related information through the terminal-common or terminal-specific higher layer signaling at operation 700. The terminal also receives DL control information through the previously configured terminal-common or terminal-specific DL control channel at operation 702. The terminal determines an interpreting method for a time resource region among the resource regions to which the UL or DL data included in the DL control information is allocated at operation 704.

When the CP related information previously configured through the terminal-common or terminal-specific higher layer signaling is the NCP (or when the CP related information is not previously configured through the terminal-common or terminal-specific higher layer signaling), the terminal interprets the A type data time resource information at operation 706. The A type data time resource information interpreting method may take into account one of Equation 1, Equation 3-1, Equation 3-2, or Equation 3-3.

When the CP related information previously configured through the terminal-common or terminal-specific higher layer signaling is the ECP, the terminal interprets the B type data time resource information at operation 708. The B type data time resource information interpreting method may take into account one of Equation 2-1, Equation 2-2, Equation 2-3, Equation 2-4, Equation 2-5, Equation 3-1, Equation 3-2, or Equation 3-3.

Figure 8:
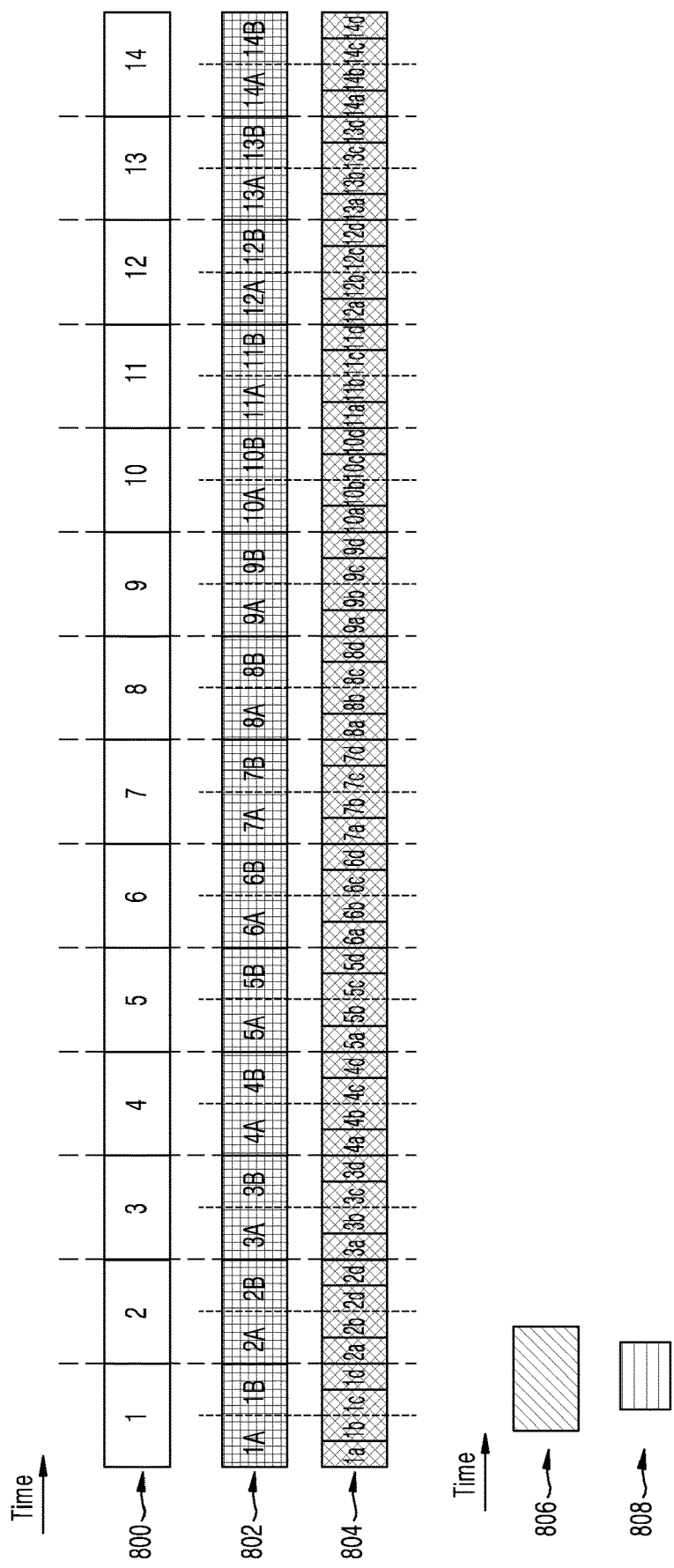
FIG. 8 is a diagram illustrating an orthogonal frequency division multiplexing (OFDM) symbol structure mapped for each sub-frame according to an embodiment of the disclosure.

FIG. 8 diagram illustrating an OFDM symbol structure mapped for each sub-frame according to an embodiment of the disclosure.

Referring to FIG. 8, the 5G or NR system may provide UL or DL physical channels with a variety of subcarrier spacing such as 15 kHz, 30 kHz, or 60 kHz. When the frequency band interval is configured, the terminal may be configured with a variety of subcarrier spacing, or may be configured independently. The terminal may be configured with the subcarrier spacing information while being included in other terminal-common or terminal-specific higher layer signaling information other than the frequency band interval configuration information. For the subcarrier spacing configured by the higher layer signaling, the terminal may differently interpret the SFI.

Figure 9:
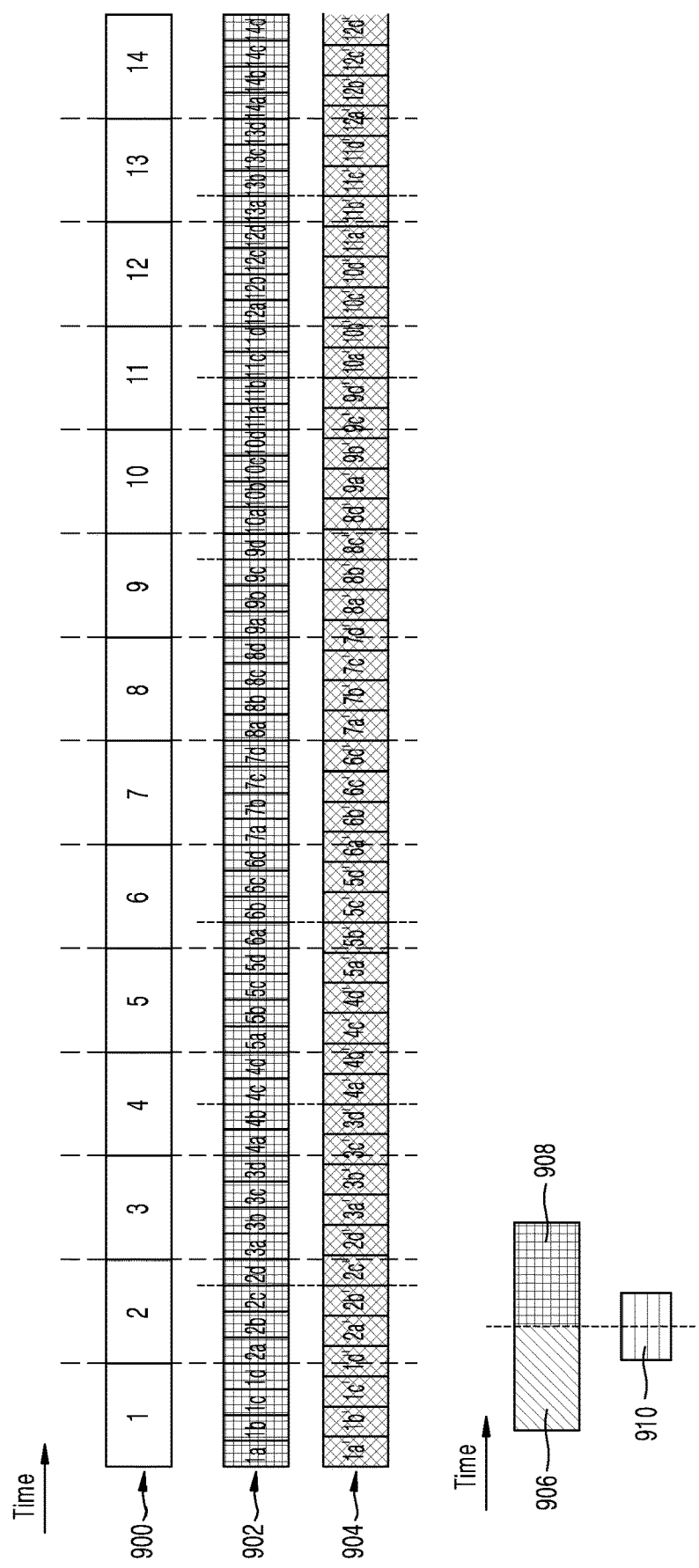
FIG. 9 is a diagram illustrating an OFDM symbol structure mapped for each sub-frame according to an embodiment of the disclosure.

FIG. 9 is a diagram illustrating an OFDM symbol structure mapped for each sub-frame having a length of 1 ms according to a variety of subcarrier spacing in an NCP situation according to an embodiment of the disclosure.

Referring to FIG. 8, reference numeral 800 shows an OFDM symbol mapping structure per slot in a subcarrier spacing of 15 kHz. The length of the slot is 1 ms, which is a subframe unit based on the LTE system, and has the same length as that of the slot of 15 kHz. There are a total of 14 OFDM symbols in a slot having a length of 1 ms. 802 shows an OFDM symbol mapping per slot in a subcarrier spacing of 30 kHz. There are two slots having a total length of 0.5 ms based on a sub-frame having a length of 1 ms, and there are 14 symbols per slot. There are a total of 28 OFDM symbols based on a sub-frame having a length of 1 ms. Reference numeral 804 shows an OFDM symbol mapping per slot in a subcarrier spacing of 60 kHz. There are four slots having a total length of 0.25 ms based on a sub-frame having a length of 1 ms, and there are 14 symbols per slot. There are a total of 56 OFDM symbols based on a sub-frame having a length of 1 ms.

When the SFI information is configured based on 15 kHz, the terminal configured with 30 kHz or 60 kHz must differently interpret the SFI information. As a method for supporting this, 30 kHz-based OFDM symbol 1A and symbol 1B corresponding to a 15 kHz-based OFDM symbol 1 in terms of time may have the same link (UL or DL). For this purpose, when the frequency band operated by the BS operates as TDD, there may occur a situation in which the link of the entire frequency band is operated only in the DL or UL at a specific time.

According to the above-described method, the terminal configured with 15 kHz may sequentially map 14 fields belonging to a specific index pointed by the SFI in terms of time. For example, when the value of format 24 in Table 4 is applied as the SFI, the terminal configured with 15 kHz determines that the first to third symbols are configured to DL, the fourth to twelfth symbols are configured to the unknown link (link that is neither DL nor UL), and the thirteenth and fourteenth symbols are configured to the UL with respect to the total of 14 symbols existing in the slot for each slot (s) indicated by the SFI.

The terminal configured with 30 kHz may determine that two consecutive symbols are mapped to correspond to one field with respect to 14 fields belonging to a specific index indicated by the SFI. For example, when the value of format 24 in Table 4 is applied as the SFI, the terminal configured with 30 kHz may determine that it is applied as the link with respect to a total of 28 symbols existing in two consecutive slots for each slot(s) indicated by the SFI. That is, it may be determined that the first to sixth symbols of the first slot are configured to DL, the seventh to fourteenth symbols of the first slot are configured to flexible links, the first to tenth symbols of the second slot are configured to flexible links, and the eleventh to fourteenth symbols are configured to UL. In summary, when the SFI is configured based on 15 kHz, the terminal configured with 30 kHz may determine that the corresponding SFI is mapped over two slots. As another example, it may be determined that when the $15*2^n$ kHz terminal receives the 15 kHz-based SFI information, the SFI is repeatedly transmitted over $2^n$ slots. As another example, it may be determined that when the $15*2^n$ kHz terminal receives the 15 kHz-based SFI information, the field of one SFI information is mapped to $2^n$ symbols over $2^n$ slots.

When 800 in FIG. 8 means SFI information based on 15 kHz, 1 to 14 of 800 coincide with symbol numbers (or indexes) 0 to 13 (or 1 to 14) in the table (for example, Table 14) indicated by each SFI. When the terminal configured with 15 kHz receives the SFI configuration, the terminal may interpret that link information indicated by the SFI for each symbol within one slot is mapped. When the terminal configured with 15*$2^n$ kHz receives the SFI configuration, it may be interpreted that the link information indicated by the SFI for each of the consecutive $2^n$ symbols within the consecutive $2^n$ slots is equally mapped. 802 is a diagram illustrating a method by which the SFI is applied to the terminal configured with 30 kHz. Symbols 1A and 1B in 802 may have the same link information as that of symbol 1 in 800. For example, when symbol 1 in 800 is DL, symbols 1A and 1B in 802 are DL. When generalized, it is possible that symbols kA and kB have the same link information as that of symbol k in 800. In this example, k has a value between 1 and 14. The symbol indexes kA and kB constituting the first slot in 802, the k value may have a value of 1 to 7 (that is, 1A, 1B, 2A, 2B, 3A, 3B, 4A, 4B, 5A, 5B, 6A, 6B, 7A, 7B), and the symbol indexes kA and kB constituting the second slot may have a k value of 8 to 14 (that is, 8A, 8B, 9A, 9B, 10A, 10B, 11A, 11B, 12A, 12B, 13A, 13B, 14A, 14B). As another example, in 802, in the logical terms, regardless of time domain, the symbol index kA constituting the first slot has a k value of 1 to 14 (that is, 1A, 2A, 3A, 4A, 5A, 6A, 7A, 8A, 9A, 10A, 11A, 12A, 13A, 14A), and the symbol index kB constituting the second slot may have a k value of 1 to 14 (that is, 1B, 2B, 3B, 4B, 5B, 6B, 7B, 8B, 9B, 10B, 11B, 12B, 13B, 14B). In this case, it is noted that each field in 802 is not time-dependent.

804 is a diagram illustrating a method by which the SFI is applied to the terminal configured with 60 kHz. Symbols 1a, 1b, 1c, and 1d in 804 may have the same link information as that of symbol 1 in 800. For example, when symbol 1 in 800 is DL, symbols 1a, 1b, 1c, and 1d in 802 are all DL. When generalized, it is possible that symbols ka, kb, kc, and kd have the same link information as that of symbol k in 800. In this example, k has a value between 1 and 14. In 804, the symbol indexes constituting the first slot are 1a, 1b, 1c, 1d, 2a, 2b, 2c, 2d, 3a, 3b, 3c, 3d, 4a, and 4b. In 804, the symbol indexes constituting the second slot are 4c, 4d, 5a, 5b, 5c, 5d, 6a, 6b, 6c, 6d, 7a, 7b, 7c, and 7d. In 804, the symbol indexes constituting the third slot are 8a, 8b, 8c, 8d, 9a, 9b, 9c, 9d, 10a, 10b, 10c, 10d, 11a, and 11b. In 804, the symbol indexes constituting the fourth slot are 11c, 11d, 12a, 12b, 12c, 12d, 13a, 13b, 13c, 13d, 14a, 14b, 14c, and 14d. As another example, the symbol index ka constituting the first slot without being dependent on the time domain may have a k value of 1 to 14 (that is, 1a, 2a, 3a, 4a, 5a, 6a, 7a, 8a, 9a, 10a, 11a, 12a, 13a, 14a), the symbol index kb constituting the second slot may have a k value of 1 to 14 (that is, 1b, 2b, 3b, 4b, 5b, 6b, 7b, 8b, 9b, 10b, 11b, 12b, 13b, 14b), the symbol index kc constituting the third slot may have a k value of 1 to 14 (that is, 1c, 2c, 3c, 4c, 5c, 6c, 7c, 8c, 9c, 10c, 11c, 12c, 13c, 14c), and the symbol index kc constituting the fourth slot may have a k value of 1 to 14 (that is, 1d, 2d, 3d, 4d, 5d, 6d, 7d, 8d, 9d, 10d, 11d, 12d, 13d, 14d). 15, 30, and 60 kHz have been described above, but it is possible to sufficiently apply to a situation in which a subcarrier spacing is configured. In this case, it is noted that each field in 802 is not time-dependent.

When the 15 kHz-based SFI is transmitted for each "a" slot period, the terminal configured with 15 kHz may determine that the SFI is repeatedly applied for each "a" slot. The terminal configured with 15*$2^n$ kHz may determine that the SFI is repeatedly applied for each a*$2^n$.

It is noted that the length of the first symbol of each slot in the relationship between the slot and the symbol illustrated for each subcarrier spacing in FIG. 8 is generally long, as compared with the length of other symbols in the same slot.

When the above method is applied, the following rule may be applied. When the terminal configured with a sub-carrier spacing other than 15 kHz receives SFI information based on 15 kHz, the link information configured in the symbol thereof may follow the link information of the 15 kHz-based symbol index 806 indicated by the 15 kHz-based SFI in which the symbol 808 is temporally dependent. That is, when the symbol index value of 806 is DL, the symbol of 808 may be DL.

In the disclosure, this rule is referred to as a first rule and may be applied to a case where the subcarrier spacing configured to the symbol 806 is identical to or different from the subcarrier spacing configured to the symbol 808. It is possible to apply to a case when the CP configured to the symbol 806 is identical to or different from the CP configured to the symbol 808.

FIG. 9 is diagram illustrating an OFDM symbol structure mapped for each sub-frame according to an embodiment.

Referring to FIG. 9, reference numeral 900 is a diagram illustrating a field (number or index) to which an SFI value based on 15 kHz may be configured. Alternatively, reference numeral 900 is a diagram illustrating the number of symbols and the index per slot in which a terminal configured with 15 kHz operates in a sub-frame having a length of 1 ms. Reference numeral 902 is a diagram illustrating the number of symbols and the index per slot in which a terminal configured with an NCP operates in a sub-frame having a length of 1 ms. A total of four slots exist. 904 is a diagram illustrating the number of symbols and the index per slot in which a terminal configured with an ECP operates in a sub-frame having a length of 1 ms. As in reference numeral 902, a total of four slots exist. However, the total number of symbols existing in one slot is 12. FIG. 8 illustrates the process of receiving and interpreting SFI information of the terminal when different subcarrier spacings are configured in a situation in which the NCP is configured, but FIG. 9 illustrates a process of receiving and interpreting SFI information of the terminal when the same or different subcarrier spacings are configured in a state in which different CPs are configured. It is difficult to apply the method of FIG. 8 to the terminal configured with 60 kHz and the ECP of 904. This is because there is no situation in which one specific symbol of the terminal configured with 60 kHz and the ECP of 904 in FIG. 9 is completely temporally included or completely coincides with one specific symbol existing in 902. However, there is a situation in which one specific symbol of the terminal configured with 60 kHz and the ECP of 904 in FIG. 9 is completely temporally included in one specific symbol existing in 900 or overlapped over two or more symbols.

Therefore, in this case, when the terminal configured with 60 kHz and the ECP receives 15 kHz and the NCP-based SFI information, appropriate SFI information interpretation is required.

It may be possible to interpret SFI information in two aspects. The first method is that the terminal configured with 60 kHz and the ECP interprets the slot format structure suitable for 60 kHz and the ECP through SFI information based on 60 kHz and the NCP. The second method is that the terminal configured with 60 kHz and the ECP interprets the slot format structure suitable for 60 kHz and the ECP through SFI information based on 15 kHz and the NCP.

According to the first method, the terminal configured with 60 kHz and the ECP of 904 interprets the link information for each symbol from the link information for each symbol according to the (re-interpreted) SFI based on 60 kHz and the NCP of 902. For example, the symbol 1a' of 904 temporally overlaps the symbols 1a and 1b of 902. In such a case, the following rule is applied.

The symbol 1a of 902 and the symbol 1b of 902 are all DL.
The symbol 1a' of 904 is DL.
The symbol 1a of 902 and the symbol 1b of 902 are all UL.
The symbol 1a' of 904 is UL.
The symbol 1a of 902 and the symbol 1b of 902 are all flexible links.
The symbol 1a' of 904 is a flexible link.
The symbol 1a of 902 is DL and the symbol 1b of 902 is UL.
The symbol 1a' of 904 is a flexible link (or DL).
The symbol 1a of 902 is DL and the symbol 1b of 902 is a flexible link.
The symbol 1a' of 904 is a flexible link (or DL).
The symbol 1a of 902 is a flexible link and the symbol 1b of 902 is UL.
The symbol 1a' of 904 is a flexible link (or UL).

The terminal determines the symbol link applied to the symbol 1a' of 904 by referring to the above rule. This scheme is applicable to all symbols configured with 60 kHz and the ECP.

According to the second method, the terminal configured with 60 kHz and the ECP of 904 interprets the link information for each symbol from the link information for each symbol according to the SFI based on 15 kHz and the NCP of 900. For example, the symbol 1a' of 904 is temporally included in symbols 1 of 900, and the link of the symbol 1a' follows the link configured to the symbol 1. As another example, the symbol 1 d' of 904 temporally overlaps symbol 1 and symbol 2 of 900. In such a case, the following rule is applied.

The symbol 1 of 900 and the symbol 2 of 900 are all DL.
The symbol 1d' of 904 is DL.
The symbol 1 of 900 and the symbol 2 of 900 are all UL.
The symbol 1d' of 904 is UL.
The symbol 1 of 900 and the symbol 2 of 900 are all flexible links.
The symbol 1d' of 904 is a flexible link.
The symbol 1 of 900 is DL and the symbol 2 of 900 is UL.
The symbol 1d' of 904 is a flexible link (or DL).
The symbol 1 of 900 is DL and the symbol 2 of 900 is a flexible link.
The symbol 1d' of 904 is a flexible link (or DL).
The symbol 1 of 900 is a flexible link and the symbol 2 of 900 is UL.
The symbol 1d' of 904 is a flexible link (or UL).

The terminal determines the symbol link applied to the symbols 1a and 1d' of 904 by referring to the above rule. This scheme is applicable to all symbols configured with 60 kHz and the ECP. Alternatively, the terminal may receive and determine DL control information, including SFI information based on 60 kHz and the ECP to which the above-described rules are applied, through the previously set DL physical control channel.

When the terminal is configured with a specific subcarrier spacing value and an ECP, the link information configured for each symbol operating based on the ECP may be configured based on one or two or more symbols based on the temporally overlapping CP in a situation in which the SFI information defined based on the NCP is received. For example, link information of a specific symbol 910 based on a specific subcarrier spacing and an ECP may be determined according to the following rule, based on the link information of the symbol(s) 906 and 908 indicated in the SFI information indicated based on the same or different subcarrier spacings temporally overlapping the corresponding symbol and an NCP.

The symbol 906 and the symbol 908 are all DL.
The symbol 910 is DL.
The symbol 906 and the symbol 908 are all UL.
The symbol 910 is UL.
The symbol 906 and the symbol 908 are all flexible links.
The symbol 910 is a flexible link.
The symbol 906 is DL, and the symbol 908 is UL.
The symbol 910 is a flexible link (or DL).
The symbol 906 is DL, and the symbol 908 is a flexible link.
The symbol 910 is a flexible link (or DL).
The symbol 906 is a flexible link, and the symbol 908 is UL.
The symbol 910 is a flexible link (or UL).

This rule is referred to as a second rule and may be applied to a case where the subcarrier spacing configured to the symbol 910 is identical to or different from the subcarrier spacing configured to the symbols 906 and 908. It is possible to apply to a case when the CP configured to the symbol 910 is identical to or different from the CP configured to the symbols 906 and 908. As another example, the second rule may be defined as follows. When the symbol 906 and the symbol 908 have the same link, the terminal may expect that the corresponding link configuration is applied to the symbol 910 as it is. When the symbol 906 and the symbol 908 have different links, the terminal may expect that the symbol 910 is configured as a flexible link (or a link of a symbol temporally much overlapping the symbol 910 among the symbols 906 and 908).

Figure 10:
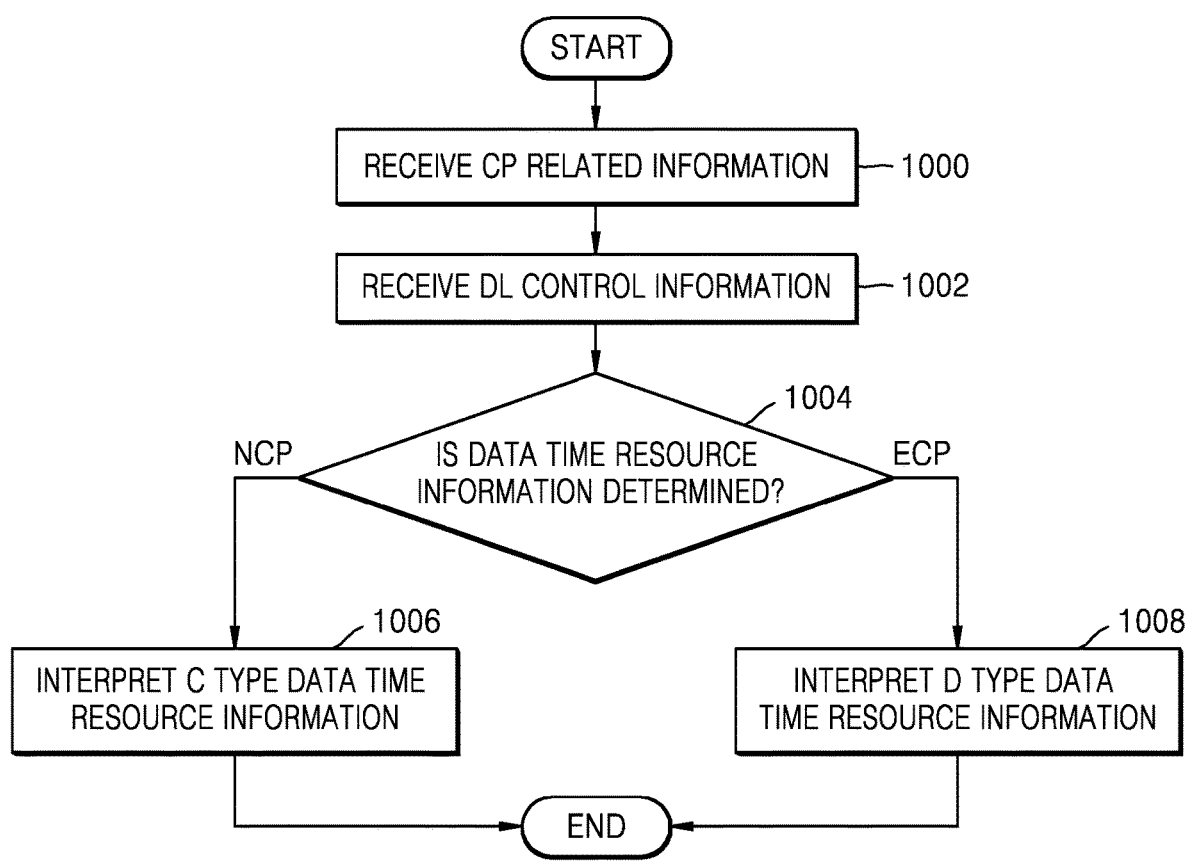
FIG. 10 is a flowchart of a method, performed by a terminal, of interpreting a DL or UL resource region based on CP information according to an embodiment of the disclosure.

FIG. 10 is a flowchart of a method, performed by a terminal, of interpreting a DL or UL resource region based on CP information according to another embodiment of the disclosure.

Referring to FIG. 10, the terminal previously receives the CP related information through the terminal-common or terminal-specific higher layer signaling at operation 1000. The terminal also receives DL control information through the previously configured terminal-common or terminal-specific DL control channel at operation 1002. The terminal determines an analysis method for a time resource region among the resource regions to which the UL or DL data included in the DL control information is allocated at operation 1004.

When the CP related information previously configured through the terminal-common or terminal-specific higher layer signaling is the NCP (or when the CP related information is not previously configured through the terminal-common or terminal-specific higher layer signaling), the terminal analyzes the C type data time resource information at operation 1006. The C type data time resource information interpreting method is a method in which when the terminal receives SFI information configured based on a specific subcarrier spacing such as 15 kHz, the terminal uses the first rule to interpret the link information on the symbols configured based on the subcarrier spacing received from the BS.

When the CP related information previously configured through the terminal-common or terminal-specific higher layer signaling is the ECP, the terminal analyzes the D type data time resource information at operation 1008. The D type data time resource information interpreting method is a method in which when the terminal receives SFI information configured based on a specific subcarrier spacing such as 15 kHz, the terminal uses the first rule or the second rule to interpret the link information on the symbols configured based on the ECP and the subcarrier spacing received from the BS. For example, the first rule may be applied when the subcarrier spacing configured to the terminal and the symbol based on the ECP is included in or identical to one of the symbol indexes of the SFI information set based on the specific subcarrier spacing in the time terms. Alternatively, the second rule is applied when the subcarrier spacing configured to the terminal and the symbol based on the ECP overlap (or is included in) two or more of the symbol indexes of the SFI information set based on the specific subcarrier spacing in the time terms.

Figure 11:
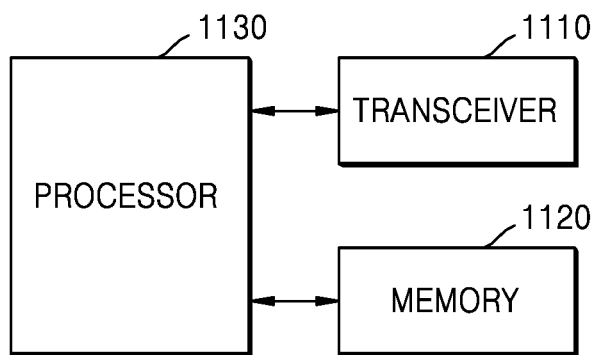
FIG. 11 is a block diagram of a terminal according to an embodiment of the disclosure.

FIG. 11 is a block diagram of a terminal according to an embodiment of the disclosure.

Referring to the FIG. 11, the terminal may include a transceiver 1110, a memory 1120, and a processor 1130. The transceiver 1110, the memory 1120, and the processor 1130 of the terminal may operate according to a communication method of the terminal. However, not all of the illustrated components are essential. The terminal may be implemented by more or less components than those illustrated in FIG. 11. In addition, the transceiver 1110, the memory 1120, and the processor 1130 may be implemented as a single chip.

The transceiver 1110 may transmit or receive a signal to or from a BS. Here, the signal may include control information and data. In this regard, the transceiver 1110 may include an RF transmitter for up-converting and amplifying a frequency of a transmitted signal, and an RF receiver for amplifying low-noise and down-converting a frequency of a received signal. However, components of the transceiver 1110 are not limited to the RF transmitter and the RF receiver.

Also, the transceiver 1110 may receive and output a signal via a wireless channel, and transmit a signal output from the processor 1130 via a wireless channel.

The memory 1120 may store a program and data required for operations of the terminal. Also, the memory 1120 may store control information or data included in a signal obtained from the terminal. The memory 1120 may be configured as a storage medium, such as read-only memory (ROM), random access memory (RAM), a hard disk, a compact disc-ROM (CD-ROM), and a digital versatile disc (DVD), or a combination of storage media.

The processor 1130 may control a series of processes such that the terminal operates according to embodiments described above. According to an embodiment, the processor 1130 may receive the CP related resource configuration and the bandwidth interval configuration signals from the BS through the transceiver 1110, interpret the CP related resource configuration and the bandwidth interval configuration signal, and perform control to transmit data in the resource region based on the CP related resource configuration and the bandwidth interval configuration through the transceiver 1110.

Figure 12:
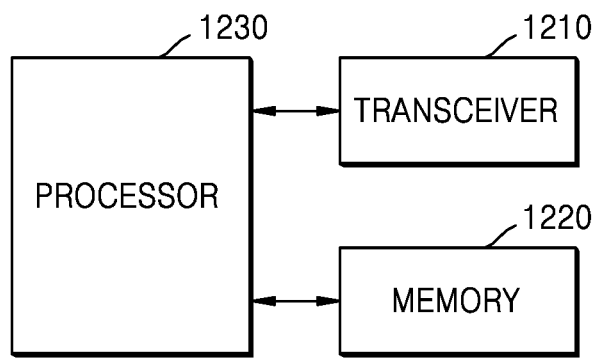
FIG. 12 is a block diagram of a base station according to an embodiment of the disclosure.

FIG. 12 is a block diagram illustrating of a BS according to an embodiment of the disclosure.

Referring to FIG. 12, the BS may include a transceiver 1210, a memory 1220, and a processor 1230. The transceiver 1210, the memory 1220, and the processor 1230 of the BS may operate according to a communication method of the BS. However, not all of the illustrated components are essential. The BS may be implemented by more or less components than those illustrated in FIG. 12. In addition, the transceiver 1210, the memory 1220, and the processor 1230 may be implemented as a single chip.

The transceiver 1210 may transmit or receive a signal to or from a terminal. Here, the signal may include control information and data. In this regard, the transceiver 1210 may include an RF transmitter for up-converting and amplifying a frequency of a transmitted signal, and an RF receiver for amplifying low-noise and down-converting a frequency of a received signal. However, components of the transceiver 1210 are not limited to the RF transmitter and the RF receiver.

Also, the transceiver 1210 may receive and output a signal via a wireless channel, and transmit a signal output from the processor 1230 via a wireless channel.

The memory 1220 may store a program and data required for operations of the BS. Also, the memory 1220 may store control information or data included in a signal obtained from the BS. The memory 1220 may be configured as a storage medium, such as ROM, random access memory (RAM), a hard disk, a CD-ROM, and a digital versatile disc (DVD), or a combination of storage media.

The processor 1230 may control a series of processes such that the BS operates according to embodiments described above. In the embodiment, the processor 1230 may determine the CP related configuration and the bandwidth interval configuration, and generate the CP related resource configuration and bandwidth interval configuration information to be transmitted to the terminal. Then, the processor 1230 may transmit the CP related resource configuration and bandwidth interval configuration information to the terminal through the transceiver 1210, and perform control to receive data with respect to the resource region to which the CP related resource configuration and the bandwidth interval are configured. In this case, the DCI may indicate the second signal transmission timing information. Also, the processor 1230 may generate DL control information (DCI) or UL signaling (for example, RRC) including the CP related resource configuration and the bandwidth interval configuration. In this case, the DCI or the RRC may indicate the CP related resource configuration and the bandwidth interval configuration information.

Methods according to embodiments described in claims or specification of the disclosure may be implemented as hardware, software, or a combination of hardware and software.

When implemented as software, a non-transitory computer-readable storage medium storing at least one program (software module) may be provided. The at least one program stored in the non-transitory computer-readable storage medium is configured to be executable by one or more processors in an electronic device. The one or more processors include instructions causing the electronic device to execute the methods according to embodiments described in claims or specification of the disclosure.

The at least one program (the software module, the software) may be stored in a non-volatile including RAM and ROM, an electrically erasable programmable read-only memory (EEPROM), a magnetic disc storage device, CD-ROM, DVD, other optical storage devices, a magnetic cassette, or the like, or a memory configured of any or all combinations thereof. Also, each of configuration memories may be provided in a multiple number.

The at least one program may be stored in an attachable storage device that can be accessed via a communication network including Internet, Intranet, a local area network (LAN), a wide LAN (WLAN), or a storage area network (SAN), or a combination thereof. The storage device may access, via an external port, an apparatus for performing embodiments of the disclosure. Also, a separate storage device on a communication network may access the apparatus for performing embodiments of the disclosure.

In the embodiments of the disclosure, a component is expressed in a singular form or a plural form according to each specific embodiment. However, the singular or plural form is selected merely according to a suggested situation for convenience of description, and thus the disclosure is not limited by single or plural components. Thus, a plurality of components may be a single component, or a single component may be a plurality of components.

It should be understood that embodiments described herein should be considered in a descriptive sense only and not for purposes of limitation. Descriptions of features or aspects within each embodiment should typically be considered as available for other similar features or aspects in other embodiments. Also, the embodiments described above may operate in combination with each other as occasion demands. For example, a BS and a terminal may operate with some of the embodiments combined together. Also, the above embodiments are suggested based on an FDD LTE system, but other modifications based on the technical aspects of the embodiments may be possible for other systems, such as TDD LTE, 5G, and NR systems.

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the following claims and their equivalents.

What is claimed is:

1. An operation method of a terminal in a wireless communication system, the operation method comprising:
receiving a subcarrier spacing configuration indicating a subcarrier spacing of 60 kHz and cyclic prefix information indicating an extended cyclic prefix from a base station through higher layer signaling;
receiving a slot format indicator with a first value;
determining a symbol having the extended cyclic prefix as a flexible symbol in case that at least one of symbols having a normal cyclic prefix and overlapping the symbol is a flexible symbol according to a slot format indicated by the first value;
determining the symbol having the extended cyclic prefix as an uplink symbol in case that all symbols having the normal cyclic prefix and overlapping the symbol are uplink symbols according to the slot format indicated by the first value; and
determining the symbol having the extended cyclic prefix as downlink symbol in case that all symbols having the normal cyclic prefix and overlapping the symbol are downlink symbols according to the slot format indicated by the first value.

2. The operation method of claim 1, wherein the first value is related with a subcarrier spacing of 15 kHz, 30 kHz, or 60 kHz.

3. The operation method of claim 1, further comprising:
determining the symbol having the extended cyclic prefix as a flexible symbol in case that symbols having the normal cyclic prefix and overlapping the symbol include a downlink symbol and an uplink symbol according to the slot format indicated by the first value.

4. A terminal operating in a wireless communication system, the terminal comprising:
a transceiver;
at least one memory storing a program; and
at least one processor, by executing the program, configured to:
receive a slot format indicator with a first subcarrier spacing configuration from a base station through higher layer signaling,
receive a bandwidth part configuration including a second subcarrier spacing configuration from the base station through higher layer signaling,
determine $2^n$ consecutive symbols for the second subcarrier spacing configuration as flexible symbols in case that a symbol constituting a slot format based on slot format information and corresponding to the $2^n$ consecutive symbols is a flexible symbol;
determine $2^n$ consecutive symbols for the second subcarrier spacing configuration as uplink symbols in case that the symbol constituting the slot format based on the slot format information and corresponding to the $2^n$ consecutive symbols is an uplink symbol; and
determine $2^n$ consecutive symbols for the second subcarrier spacing configuration as downlink symbols in case that the symbol constituting the slot format based on the slot format information and corresponding to the $2^n$ consecutive symbols is a downlink symbol.

5. The terminal of claim 4, wherein the value of n indicates a difference between a value of the first subcarrier spacing configuration and a value of the second subcarrier spacing configuration, and the value of n is a natural number.

6. The terminal of claim 4, wherein the 2n consecutive symbols are temporally dependent on the symbol of the slot format based on the slot format information for the first subcarrier spacing configuration.

7. An operation method of a terminal in a wireless communication system, the operation method comprising:
receiving a slot format information for a first subcarrier spacing configuration from a base station through higher layer signaling;
receiving a bandwidth part configuration including a second subcarrier spacing configuration from the base station through higher layer signaling;
determining $2^n$ consecutive symbols for the second subcarrier spacing configuration as flexible symbols in case that a symbol constituting a slot format based on the slot format information and corresponding to the $2^n$ consecutive symbols is a flexible symbol;
determining $2^n$ consecutive symbols for the second subcarrier spacing configuration as uplink symbols in case that the symbol constituting the slot format based on the slot format information and corresponding to the $2^n$ consecutive symbols is an uplink symbol; and
determining $2^n$ consecutive symbols for the second subcarrier spacing configuration as downlink symbols in case that the symbol constituting the slot format based on the slot format information and corresponding to the $2^n$ consecutive symbols is a downlink symbol.

8. The operation method of claim 7, wherein the value of n indicates a difference between a value of the first subcarrier spacing configuration and a value of the second subcarrier spacing configuration, and the value of n is a natural number.

9. The operation method of claim 7, wherein the $2^n$ consecutive symbols are temporally dependent on the symbol of the slot format based on the slot format information for the first subcarrier spacing configuration.

10. A terminal operating in a wireless communication system, the terminal comprising:
- a transceiver;
- at least one memory storing a program; and
- at least one processor, by executing the program, configured to:
  - receive a subcarrier spacing indicating a subcarrier spacing of 60 kHz configuration and cyclic prefix information indicating an extended cyclic prefix from a base station through higher layer signaling,
  - receive a slot format indicator with a first value,
  - determine a symbol having the extended cyclic prefix as a flexible symbol in case that at least one of symbols having a normal cyclic prefix and overlapping the symbol is a flexible symbol according to a slot format indicated by the first value,
  - determine the symbol having the extended cyclic prefix as an uplink symbol in case that all symbols having the normal cyclic prefix and overlapping the symbol are uplink symbols according to the slot format indicated by the first value, and
  - determine the symbol having the extended cyclic prefix as downlink symbol in case that all symbols having the normal cyclic prefix and overlapping the symbol are downlink symbols according to the slot format indicated by the first value.

11. The terminal of claim 10, wherein the slot format indicator is configured with a subcarrier spacing of 15 kHz, 30 kHz, or 60 kHz.

12. The terminal of claim 10, wherein the at least one processor is further configured to, determine the symbol having the extended cyclic prefix as a flexible symbol in case that symbols having the normal cyclic prefix and overlapping the symbol include a downlink symbol and an uplink symbol according to the slot format indicated by the first value.

* * * * *